US012488743B1

(12) United States Patent
Hu et al.

(10) Patent No.: US 12,488,743 B1
(45) Date of Patent: Dec. 2, 2025

(54) DISPLAY PANEL AND DISPLAY DEVICE

(71) Applicant: Shanghai Tianma Micro-electronics Co., Ltd., Shanghai (CN)

(72) Inventors: Cancan Hu, Shanghai (CN); Jiankun Gong, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 0 days.

(21) Appl. No.: 19/085,407

(22) Filed: Mar. 20, 2025

(30) Foreign Application Priority Data

Dec. 30, 2024 (CN) ........................ 202411981276.2

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01); *G09G 2300/0861* (2013.01); *G09G 2310/06* (2013.01); *G09G 2310/08* (2013.01); *G09G 2330/023* (2013.01); *G09G 2340/0435* (2013.01)

(58) Field of Classification Search
CPC ............. G09G 3/32; G09G 2300/0426; G09G 2300/0819; G09G 2300/0861; G09G 2310/06; G09G 2310/08; G09G 2330/023; G09G 2340/0435
See application file for complete search history.

(56) References Cited

U.S. PATENT DOCUMENTS

2021/0175320 A1* 6/2021 Peng .................... H10K 59/131

* cited by examiner

*Primary Examiner* — Yaron Cohen
(74) *Attorney, Agent, or Firm* — Anova Law Group, PLLC

(57) ABSTRACT

Display panel and display device are provided. The display panel includes a base substrate; an active layer on a side of the base substrate; a plurality of pixel circuits arranged in an array along a first direction and a second direction, the first direction intersecting the second direction; and a plurality of first scan lines, a plurality of second scan lines and a plurality of reference voltage lines, all of which extend along the first direction. A pixel circuit of the plurality of pixel circuits includes a gate reset transistor and an anode reset transistor. The gate reset transistor includes a first channel region in the active layer. The first channel region overlaps a first scan line of the plurality of first scan lines in a direction perpendicular to a plane of the base substrate. The anode reset transistor includes a second channel region in the active layer.

20 Claims, 16 Drawing Sheets

DISPLAY PANEL AND DISPLAY DEVICE

CROSS-REFERENCE TO RELATED APPLICATION

This application claims priority of Chinese Patent Application No. 202411981276.2, filed on Dec. 30, 2024, the entire contents of which are hereby incorporated by reference.

FIELD OF THE DISCLOSURE

The present disclosure generally relates to the field of display technology and, more particularly, relates to a display panel and a display device.

BACKGROUND

At present, display panels can display images at different refresh frequencies. When high-speed driving is required, pixel circuits can be driven by increasing a refresh frequency. Conversely, when power consumption needs to be reduced or low-speed driving is required, the pixel circuits can be driven by lowering the refresh frequency. The pixel circuits drive light-emitting elements to emit light.

However, when the refresh frequency is lowered to drive the pixel circuits, due to the lower refresh frequency, leakage currents in the pixel circuits become more significant, making the display panel prone to screen shaking. Therefore, pixel circuits operating at a low frequency require design modifications and improvements. For example, additional scan lines can be introduced, and a driving mode of low-frequency pixel circuits can be adjusted to reduce screen shaking in the display panel. Alternatively, enlarging the storage capacitor area in the pixel circuits can also help reduce screen shaking. However, the above methods require low-frequency pixel circuits to occupy more space, which hinders a development of display panels with higher pixel density and resolution.

BRIEF SUMMARY OF THE DISCLOSURE

One aspect of the present disclosure provides a display panel. The display panel includes a base substrate; an active layer on a side of the base substrate; a plurality of pixel circuits arranged in an array along a first direction and a second direction, the first direction intersecting the second direction; and a plurality of first scan lines, a plurality of second scan lines, and a plurality of reference voltage lines, all of which extend along the first direction. A pixel circuit of the plurality of pixel circuits includes a gate reset transistor and an anode reset transistor. The gate reset transistor includes a first channel region in the active layer. The first channel region overlaps a first scan line of the plurality of first scan lines in a direction perpendicular to a plane of the base substrate. The anode reset transistor includes a second channel region in the active layer. The second channel region overlaps a second scan line of the plurality of second scan lines in the direction perpendicular to the plane of the base substrate. In a same column of pixel circuits, the second channel region of the anode reset transistor in an i-th row of pixel circuits is directly connected to the first channel region of the gate reset transistor in an (i+1)-th row of pixel circuits through a first connection portion in the active layer. A reference voltage line of the plurality of reference voltage lines is electrically connected to the first connection portion where i is a positive integer.

Another aspect of the present disclosure provides a display device including a display panel. The display panel includes a base substrate; an active layer on a side of the base substrate; a plurality of pixel circuits arranged in an array along a first direction and a second direction, the first direction intersecting the second direction; and a plurality of first scan lines, a plurality of second scan lines, and a plurality of reference voltage lines, all of which extend along the first direction. A pixel circuit of the plurality of pixel circuits includes a gate reset transistor and an anode reset transistor. The gate reset transistor includes a first channel region in the active layer. The first channel region overlaps a first scan line of the plurality of first scan lines in a direction perpendicular to a plane of the base substrate. The anode reset transistor includes a second channel region in the active layer. The second channel region overlaps a second scan line of the plurality of second scan lines in the direction perpendicular to the plane of the base substrate. In a same column of pixel circuits, the second channel region of the anode reset transistor in an i-th row of pixel circuits is directly connected to the first channel region of the gate reset transistor in an (i+1)-th row of pixel circuits through a first connection portion in the active layer. A reference voltage line of the plurality of reference voltage lines is electrically connected to the first connection portion where i is a positive integer.

Other aspects of the present disclosure can be understood by a person skilled in the art in light of the description, the claims, and accompanying drawings of the present disclosure.

BRIEF DESCRIPTION OF THE DRAWINGS

To better illustrate technical solutions in embodiments of the present disclosure, the accompanying drawings used in the description of the embodiments are briefly introduced below. Obviously, the accompanying drawings described below represent only some embodiments of the present disclosure. A person skilled in the art can derive other drawings based on the accompanying drawings without creative efforts.

DETAILED DESCRIPTION

Technical solutions in the embodiments of the present disclosure will be clearly and completely described below with reference to the embodiments of the present disclosure. Obviously, the embodiments described herein represent only a portion, not all, of the embodiments of the present disclosure. Any other embodiments derived by a person skilled in the art without creative efforts fall within the protection scope of the present disclosure.

The following description provides specific details to ensure a comprehensive understanding of the present disclosure. However, the present disclosure can also be implemented in ways different from the embodiments described herein. A person skilled in the art can make similar generalizations without departing from the essence of the present disclosure. Therefore, the present disclosure is not limited to the specific embodiments disclosed below.

Figure 1:
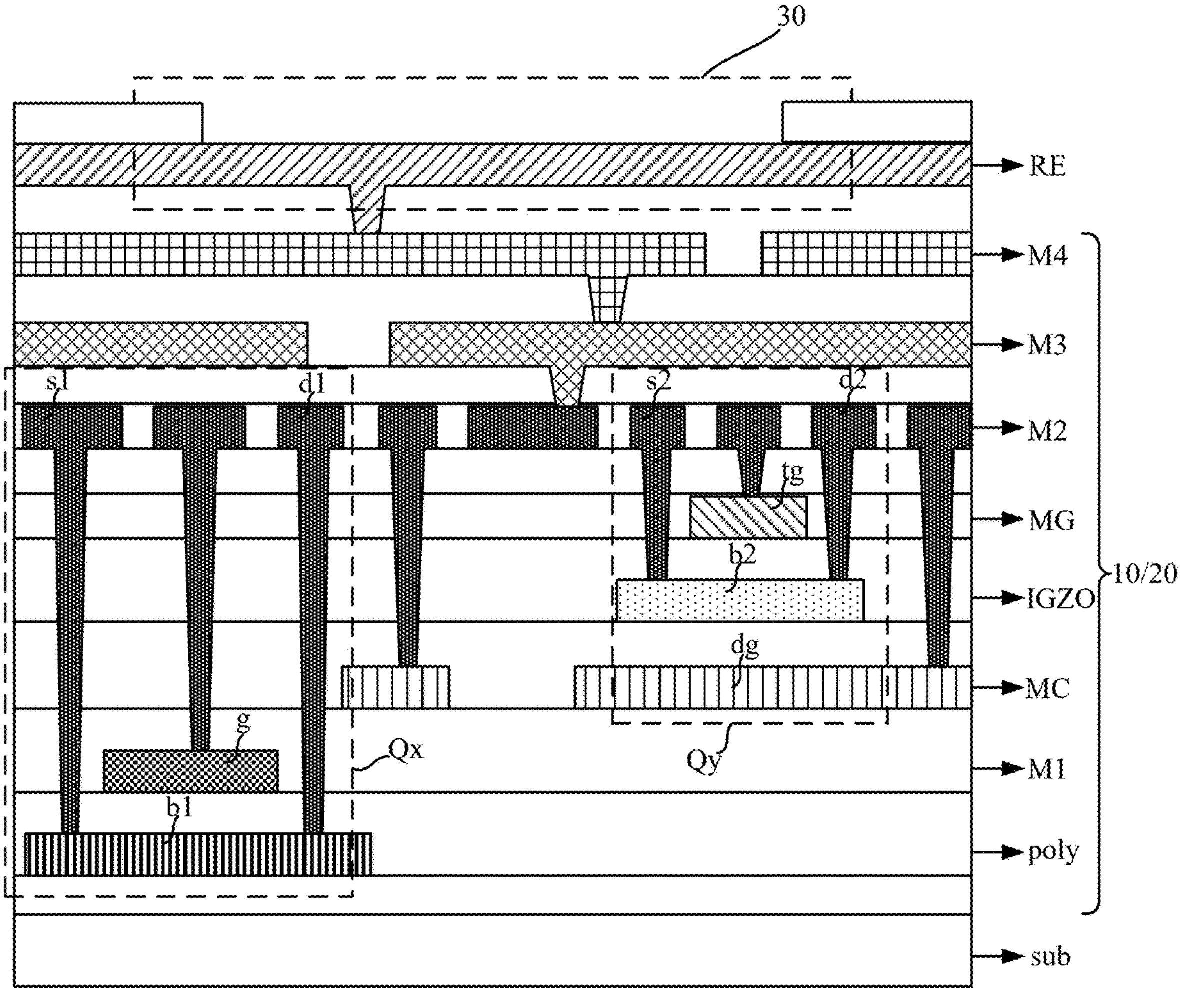
FIG. 1 illustrates a cross-sectional view of a display panel consistent with various embodiments of the present disclosure.

FIG. 1 illustrates a cross-sectional view of a display panel consistent with various embodiments of the present disclosure. As shown in FIG. 1, the display panel includes a base substrate (sub), an active layer (poly) on a side of the base substrate (sub), a plurality of metal layers on a side of the active layer (poly) away from the base substrate (sub), and an oxide layer (IGZO). The plurality of metal layers includes metal layers M1, MC, MG, M2, M3, M4 and RE, arranged in a direction away from the base substrate (sub). The oxide layer (IGZO) is located between the metal layer MC and the metal layer MG. Gaps between different metal layers, between metal layers and active layers, and between metal layers and oxide layer are all isolated by insulating layers.

Figure 2:
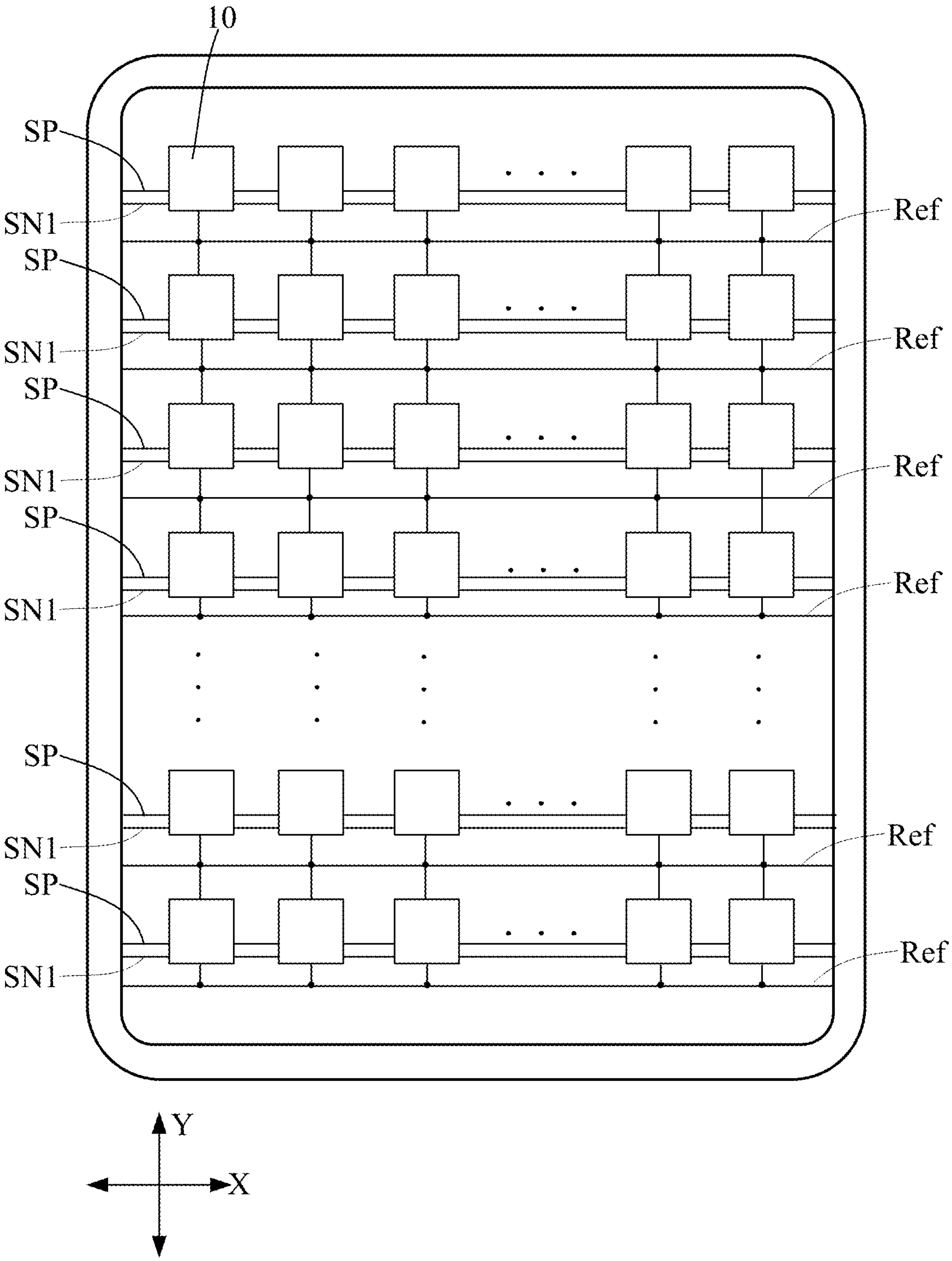
FIG. 2 illustrates a top view of a display panel consistent with various embodiments of the present disclosure.

FIG. 2 illustrates a top view of a display panel consistent with various embodiments of the present disclosure. As shown in FIG. 2, the display panel includes a plurality of pixel circuits 10 arranged in an array along a first direction (X) and a second direction (Y). The first direction (X) intersects the second direction (Y). The first direction (X) and the second direction (Y) are parallel to a plane of the base substrate.

As shown in FIG. 2, the display panel also includes a plurality of first scan lines (SN1), a plurality of second scan lines (SP) and a plurality of reference voltage lines (Ref) extending along the first direction (X).

As shown in FIGS. 1 and 2, the pixel circuits 10 are on the base substrate (sub), mainly distributed in the active layer (poly) and some metal layers. Signal lines 20, electrically connected to pixel circuit 10, such as first scan lines (SN1) and third scan lines (SN2) and the reference voltage lines (Ref), are in some metal layers. Light-emitting elements 30 are located on a side of the pixel circuit 10 away from the base substrate (sub). The pixel circuits 10 are configured to drive the light-emitting elements 30 to emit light.

Figure 3:
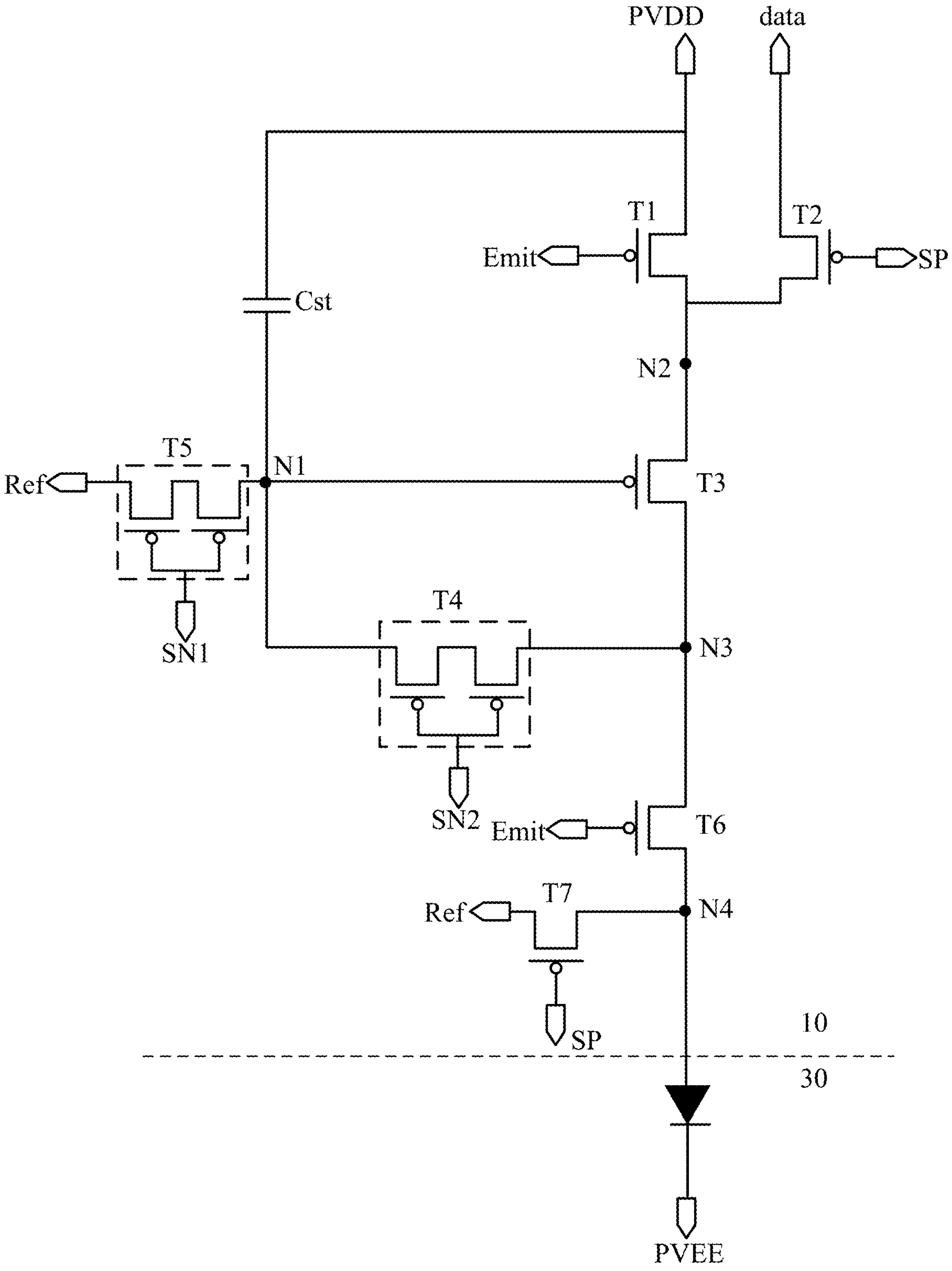
FIG. 3 illustrates a circuit diagram of a pixel circuit in a display panel consistent with various embodiments of the present disclosure.

FIG. 3 illustrates a circuit diagram of the pixel circuit 10 in a display panel consistent with various embodiments of the present disclosure. As shown in FIG. 3, the pixel circuit 10 includes a first light emission control transistor (T1), a data writing transistor (T2), a driving transistor (T3), a compensation transistor (T4), a gate reset transistor (T5), a second light emission control transistor (T6), an anode reset transistor (T7) and a storage capacitor (Cst). The signal lines 20 electrically connected to the pixel circuit 10 include a first scan line (SN1), a second scan line (SP), a third scan line (SN2), a light emitting control line (Emit), a data line (data) and a first power supply voltage line (PVDD). The pixel circuit 10 is electrically connected to an anode of a light-emitting element 30, and a cathode of the light-emitting element 30 is electrically connected to a second power supply voltage line (PVEE).

A first electrode of the first light-emitting control transistor (T1) is electrically connected to the first power supply voltage line (PVDD), a second electrode of the first light-emitting control transistor (T1) is electrically connected to a second node (N2), and a gate of the first light emission control transistor (T1) is electrically connected to the light emission control line (Emit).

A first electrode of the data writing transistor (T2) is electrically connected to the data line (data), a second electrode of the data writing transistor (T2) is electrically connected to the second node (N2), and a gate of the data writing transistor (T2) is electrically connected to a second scan line (SP).

A first electrode of the driving transistor (T3) is electrically connected to the second node (N2), a second electrode of the driving transistor (T3) is electrically connected to a third node (N3), and a gate of the driving transistor (T3) is electrically connected to a first node (N1).

A first electrode of the compensation transistor (T4) is electrically connected to the third node (N3), a second electrode of the compensation transistor (T4) is electrically connected to the first node (N1), and a gate of the compensation transistor (T4) is electrically connected to the third scan line (SN2).

A first electrode of the gate reset transistor (T5) is electrically connected to a reference voltage line (Ref), a second electrode of the gate reset transistor (T5) is electrically connected to the first node (N1), and a gate of the gate reset transistor (T5) is electrically connected to the first scan line (SN1).

A first electrode of the second light-emitting control transistor (T6) is electrically connected to the third node (N3), a second electrode of the second light-emitting control transistor (T6) is electrically connected to a fourth node (N4), and a gate of the second light emission control transistor (T6) is electrically connected to the light emission control line (Emit).

A first electrode of the anode reset transistor (T7) is electrically connected to the reference voltage line (Ref), a second electrode of the anode reset transistor (T7) is electrically connected to the fourth node (N4), and a gate of the anode reset transistor (T7) is electrically connected to the second scan line (SP).

Therefore, the pixel circuit 10 of a 7T1C structure is realized.

It can be understood that the first node (N1), the second node (N2), the third node (N3) and the fourth node (N4) may be virtual connection nodes or actual physical connection nodes.

It should be noted that the pixel circuit 10 shown in FIG. 3 is only an example. In practical applications, pixel circuits with different circuit structures can be selected based on specific requirements and are not limited to the 7T1C pixel circuit shown in FIG. 3.

It should also be noted that, as shown in FIG. 1 and FIG. 3, each thin-film transistor in the pixel circuit 10 can be a low-temperature polysilicon (LTPS) thin-film transistor (Qx). Specifically, the LTPS thin-film transistor Qx includes an active layer (b1), a gate (g), a source (s1) and a drain (d1). Each thin-film transistor in the pixel circuit 10 can also be an indium gallium zinc oxide (IGZO) thin-film transistor (Qy). Specifically, the IGZO thin-film transistor (Qy) includes an oxide layer (b2), a bottom gate (dg), a top gate (tg), a source (s2), and a drain (d2).

Optionally, as shown in FIG. 1 and FIG. 3, in the pixel circuit 10, the compensation transistor (T4) and the gate reset transistor (T5) can be IGZO thin-film transistors, with a double-gate structure, including the bottom gate (dg) and the top gate (tg). Other thin-film transistors can be LTPS thin-film transistors. Since the IGZO thin-film transistors exhibit less leakage, the pixel circuit 10 can achieve low-frequency driving, making the pixel circuit 10 a low-frequency pixel circuit. Each thin-film transistor in the pixel circuit 10 may be a PMOS thin-film transistor.

Optionally, each thin-film transistor in the pixel circuit 10 may also be an LTPS thin-film transistor. The compensation transistor T4 and the gate reset transistor T5 may be NMOS thin-film transistors, while other thin-film transistors may be PMOS thin-film transistors.

As shown in FIG. 3, the compensation transistor T4 and the gate reset transistor T5 can be transistors with a double-gate or multi-gate structure to reduce transistor leakage current and improve display performance of the display panel.

Figure 4:
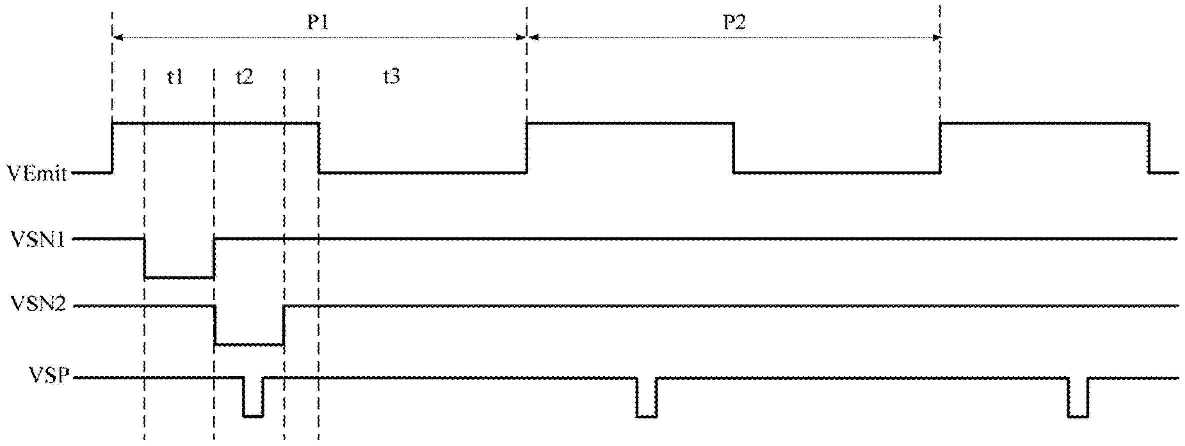
FIG. 4 illustrates a timing diagram of signals provided to the pixel circuit shown in FIG. 3.

FIG. 4 illustrates a timing diagram of signals provided to the pixel circuit 10 shown in FIG. 3. As shown in FIG. 3 and FIG. 4, the first scan line (SN1) provides a first scan signal (VSN1) to the pixel circuit 10, the second scan line (SP) provides a second scan signal (VSP) and the third scan line (SN2) provides a third scan signal VSN2 to the pixel circuit 10. The emission control line (Emit) provides an emission control signal (VEmit) and the reference voltage line (Ref) provides a reference voltage signal (VRef) to the pixel circuit 10. The first power supply voltage line (PVDD) provides a first power supply voltage signal (VPVDD) and the second power supply voltage line (PVEE) provides a second power supply voltage signal (VPVEE) to the pixel circuit 10. Taking each thin-film transistor in the pixel circuit 10 as a PMOS thin-film transistor as an example, active levels of the first scan signal (VSN1), the second scan signal (VSP), the third scan signal (VSN2) and the light emission control signal (VEmit) are low levels, while inactive levels thereof are high levels. For clarity, in subsequent structural drawings of the pixel circuit 10 in the present disclosure, each signal represents an electrical connection relationship with the pixel circuit 10 instead of a corresponding signal line.

As shown in FIG. 3 and FIG. 4, an operation of the pixel circuit 10 can be roughly divided into following periods.

During a (t1) period, the first scan signal (VSN1) is at an active level (low level), turning on the gate reset transistor (T5). The reference voltage signal (VRef), provided by the reference voltage line (Ref), passes through the activated gate reset transistor (T5), resetting the first Node N1 (i.e., the gate of the driving transistor (T3)).

During a (t2) period, the third scan signal (VSN2) is at an active level (low level), turning on the compensation transistor (T4). The second scan signal (VSP) is at an active level (low level), turning on the data writing transistor (T2). The data signal (Vdata), provided by the data line (data), is written to the gate of the driving transistor (T3), also referred to as a threshold capture of the driving transistor T3. During the (t2) period, the second scan signal (VSP), at an active level (low level), also turns on the anode reset transistor (T7). The reference voltage signal (VRef), provided by the reference voltage line (Ref), resets the fourth node (N4) through the activated anode reset transistor (T7).

During a t3 period, the light-emitting control signal (VEmit) is at an active level (low level), turning on the first light-emitting control transistor (T1) and the second light-emitting control transistor (T6). The driving transistors (T3) drive the light-emitting elements 30 to emit light.

In the display panel, the light-emitting control signal (VEmit) scans each row of pixel circuits at a fixed frequency. As shown in FIG. 4, a total period in which the light-emitting control signal (VEmit) alternates between an active level period and an inactive level period is called a frame. A frame, which includes the (t1) period, the (t2) period and the t3 period, is referred to as a data writing frame (P1). A total period in which each row of pixel circuits in the display panel completes a writing of data signals is called a data writing cycle. Therefore, a data writing cycle of the display panel includes M frames to refresh the screen, where M≥2. The M frames include a data writing frame (P1) and at least one holding frame (P2). In the data writing frame (P1), the pixel circuit 10 writes a new data signal and displays a new frame. In the holding frame (P2), the pixel circuit 10 refreshes normally, but maintains a data signal of a previous frame and displays the previous frame.

As mentioned in the background technology section, when the refresh frequency is reduced to drive the pixel circuit, the low refresh frequency can lead to significant leakage current, making the display panel prone to screen shaking. Therefore, as shown in FIGS. 3 and 4, in the pixel circuit 10, the gate reset transistor (T5) is electrically connected to the first scan line (SN1), so that the gate reset transistor (T5) is driven by the first scan signal (VSN1). The anode reset transistor (T7) is electrically connected to the second scan line (SP), so that the anode reset transistor (T7) is driven by the second scan signal (VSP). The compensation transistor (T4) is electrically connected to the third scan line (SN2), so that the compensation transistor (T4) is driven by the third scan signal (VSN2). Therefore, under low-frequency driving, during a holding frame (P2) stage of the pixel circuit 10, both the first scan signal (VSN1) and the third scan signal (VSN2) remain at an inactive level, keeping the gate reset transistor (T5) and the compensation transistor (T4) turned off, which ensures that the potential of the first node (N1) remains unchanged. The second scan signal (VSP) keeps the anode reset transistor (T7) turned on to reset the fourth node (N4), thereby reducing screen shaking in the display panel under low-frequency driving.

Figure 5:
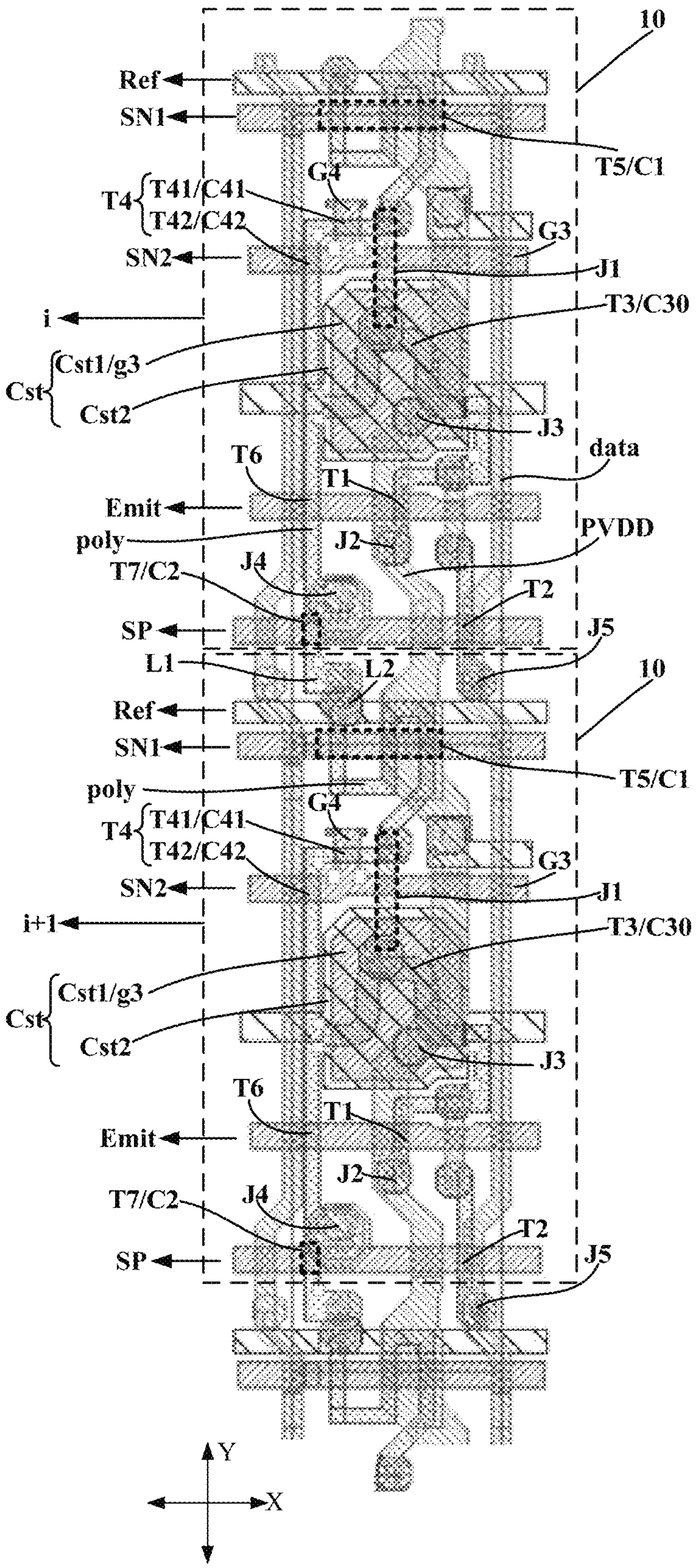
FIG. 5 illustrates a layout diagram of two adjacent rows of pixel circuits within a column of pixel circuits in a display panel consistent with various embodiments of the present disclosure.

FIG. 5 illustrates a layout diagram of two adjacent rows of pixel circuits 10 in a column of pixel circuits within a display panel consistent with various embodiments of the present disclosure. As shown in FIGS. 1, 3 and 5, the pixel circuit 10 includes a gate reset transistor (T5) and an anode reset transistor (T7). The gate reset transistor (T5) includes a first channel region (C1) in the active layer poly. In the direction perpendicular to the plane of the base substrate (sub), the first channel region (C1) overlaps the first scan line (SN1), and the overlapping portion forms the gate of the gate transistor (T5). The anode reset transistor (T7) includes a second channel region (C2) in the active layer (poly). In the direction perpendicular to the plane of the base substrate (sub), the second channel region (C2) overlaps the second scan line SP, and the overlapping portion forms the gate of the anode reset transistor T7.

Figure 6:
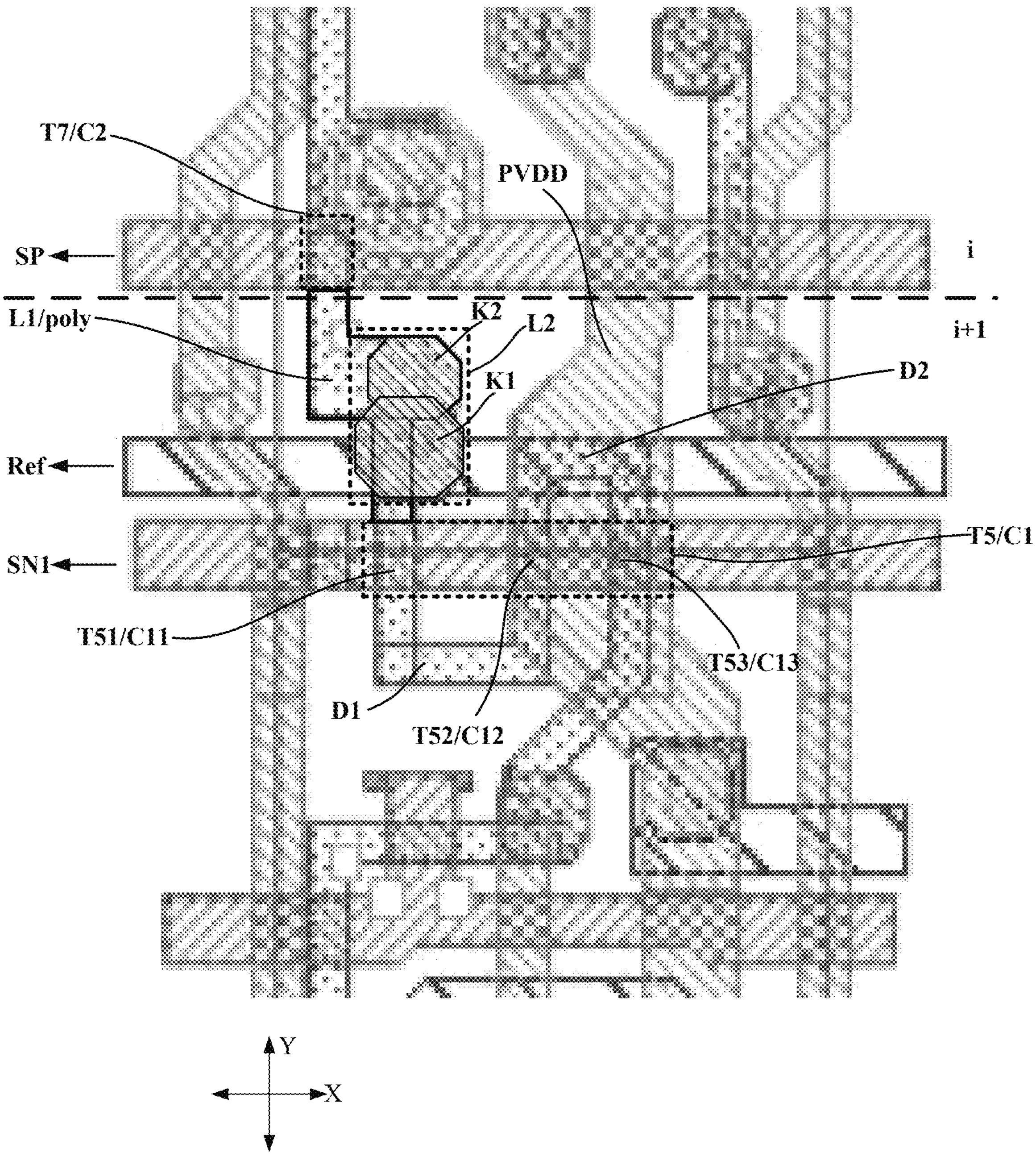
FIG. 6 illustrates an enlarged schematic diagram of a specific area shown in FIG. 5.

FIG. 6 illustrates an enlarged schematic diagram of a specific area shown in FIG. 5. As shown in FIGS. 5 and 6, in a same column of pixel circuits, the second channel region (C2) of the anode reset transistor (T7) in an i-th row of pixel circuits 10 is directly connected to the first channel region (C1) of the gate reset transistor (T5) in an (i+1)-th row of pixel circuits through the first connection portion (L1) in the active layer (poly). That is, in a same column of pixel circuits 10, the second channel region (C2) of the anode reset transistor (T7) in the i-th row of pixel circuits 10 is directly connected to the first connection portion (L1) in the active layer (poly), and the first channel region (C1) of the gate reset transistor (T5) in the (i+1)-th row of pixel circuits 10 is also directly connected to the first connection portion (L1) in the active layer (poly). Therefore, in a same column of pixel circuits 10, the second channel region (C2) of the anode reset transistor (T7) in the i-th row of pixel circuits 10 is directly connected to the first channel region (C1) of the gate reset transistor (T5) in the (i+1)-th row of pixel circuits through the first connection portion (L1) in a same layer. In other words, in a same column of pixel circuits, the second channel region (C2) of the anode reset transistor (T7) in the i-th row of pixel circuits 10 is directly connected to the first channel region (C1) of the gate reset transistor (T5) in the (i+1)-th row of pixel circuits 10 through the first connection portion (L1) in the active layer (poly), where i is a positive integer.

As shown in FIGS. 5 and 6, the first connection portion (L1) is electrically connected to the reference voltage line (Ref). Therefore, in a same column of pixel circuits, the reference voltage line (Ref) may be electrically connected to the anode reset transistor T7 in the i-th row of pixel circuits 10 and the gate reset transistor T5 in the (i+1)-th row of pixel circuits 10 through the first connection portion (L1).

Therefore, number of holes electrically connected to the reference voltage line (Ref) and the anode reset transistor (T7) of the i-th row of pixel circuits 10, as well as the gate reset transistor (T5) in the (i+1)-th row pixel circuit in a same column of pixel circuits can be reduced, thereby saving space occupied by the pixel circuits 10. If the pixel circuits 10 operate in a low-frequency driving mode, the space occupied by the low-frequency pixel circuits can be further reduced, which is conducive to the development of display panels with high pixel density and resolution.

As shown in FIG. 1, FIG. 5 and FIG. 6, the first scan line SN1 may be located on the metal layer M1, and the second scan line SP may also be located on the metal layer M1.

As shown in FIG. 1, FIG. 5 and FIG. 6, the reference voltage line (Ref) can be located on the first metal layer, which is on a side of the active layer poly facing away from the base substrate (sub). The first metal layer can be the metal layer (MC), and the first connection portion (L2) is located in the active layer (poly), so that the reference voltage line (Ref) and the first connection portion (L1) are arranged on separate layers.

As shown in FIG. 1, FIG. 5 and FIG. 6, the reference voltage line (Ref) is electrically connected to the first connection portion (L1) through the second connection portion (L2) on the second metal layer, which is located on a side of the first metal layer facing away from the base substrate (sub). Optionally, the first metal layer is the metal layer (MC), the second metal layer is the metal layer M2, which is located on the side of metal layer (MC) facing away from the base substrate (sub). The reference voltage line (Ref) on the metal layer (MC) is electrically connected to the first connection portion (L1) in the active layer (poly) through the second connection portion (L2) on the metal layer (M2).

It can be understood that the reference voltage line (Ref) is electrically connected to the second connection portion L2 through a via hole that passes between the first metal layer (i.e., the metal layer MC) and the second metal layer (i.e., the metal layer M2). The second connection part (L2) is electrically connected to the first connection part (L1) through a via hole that passes between the second metal layer (i.e., the metal layer M2) and the active layer (poly). The first connection portion (L1), located in the active layer (poly), is electrically connected to the second channel region (C2) of the anode reset transistor (T7) in the i-th row of pixel circuits 10 and the first channel region (C1) of the gate reset transistor (T5) in the (i+1)-th row of pixel circuits in a same column of pixel circuits. Therefore, the reference voltage line (Ref) only needs to pass through two via holes to transmit the reference voltage signal (VRef) to the second channel region (C2) of the anode reset transistor (T7) in the i-th row of pixel circuits 10 and the first channel region (C1) of the gate reset transistor (T5) in the (i+1)-th row of pixel circuits within a same column of pixel circuits.

In some existing display panels, in a same column of pixel circuits, the second channel region (C2) of the anode reset transistor (T7) in the i-th row of pixel circuits 10 is disconnected from the first channel region (C1) of the gate reset transistor (T5) in the (i+1)-th row of pixel circuits. Therefore, the reference voltage line (Ref) is electrically connected to the second connection portion (L2) through a via hole that passes between the first metal layer (i.e., the metal layer MC) and the second metal layer (i.e., the metal layer M2). In a same column of pixel circuits, the second connection portion (L2) not only needs to be electrically connected to the second channel region (C2) of the anode reset transistor (T7) in the i-th row of pixel circuits 10 through a via hole that passes between the second metal layer (i.e., the metal layer M2) and the active layer poly, but also needs to be electrically connected to the first channel region (C1) of the gate reset transistor (T5) in the (i+1)-th row of pixel circuits through another via hole that passes between the second metal layer (i.e., the metal layer M2) and the active layer (poly). Therefore, in a same column of pixel circuits, the reference voltage line (Ref) needs to pass through at least three via holes to transmit the reference voltage signal (VRef) to the second channel region (C2) of the anode reset transistor (T7) in the i-th row of pixel circuits 10 and to the first channel region (C1) of the gate reset transistor (T5) in the (i+1)-th row of pixel circuits.

In the display panel provided by the embodiments of the present disclosure, in a same column of pixel circuits, the second channel region (C2) of the anode reset transistor (T7) in the i-th row of pixel circuits 10 is directly connected to the first channel region (C1) of the gate reset transistor (T5) in the (i+1)-th row of pixel circuits 10 through the first connection portion (L1) in the active layer (poly). Therefore, the reference voltage line Ref only needs to pass through two via holes to transmit the reference voltage signal (VRef) to the second channel region (C2) of the anode reset transistor (T7) in the i-th row of pixel circuits 10 and to the first channel region (C1) of the gate reset transistor (T5) in the (i+1)-th row of pixel circuits within a same column of pixel circuits, thereby saving space occupied by the pixel circuits. Considering a large number of pixel circuits in the display panel, reducing one via hole in space occupied by each pixel circuit can increase a pixel density of the display panel, thereby improving a resolution of the display panel.

As shown in FIG. 5, a row of pixel circuits 10 is electrically connected to a first scan line (SN1) and a second scan line (SP). The first scan lines (SN1) and the second scan lines (SP) are alternately arranged along the second direction (Y). The reference voltage line (Ref) is located between the second scan line (SP) electrically connected to the i-th row of pixel circuits 10 and the first scan line (SN1) electrically connected to the (i+1)-th row of pixel circuits 10. Therefore, along the second direction Y, the first scan lines (SN1), the second scan lines (SP) and the reference voltage lines (Ref) are arranged in sequence.

As shown in FIG. 5, in a same column of pixel circuits, the second channel region (C2) of the anode reset transistor (T7) in the i-th row of pixel circuits 10 and the first channel region (C1) of the gate reset transistor (T5) in the (i+1)-th row of pixel circuits 10 are located on opposite sides of the reference voltage line (Ref) along the second direction (Y).

As shown in FIG. 5 and FIG. 6, one end of the second connection portion (L2) is electrically connected to the reference voltage line (Ref) through a first via hole K1, while the other end of the second connection portion (L2) is electrically connected to the first connection portion (L1) through a second via hole (K2). The first via hole (K1) and the second via hole (K2) are located between the second scan line SP, which is electrically connected to the i-th row of the pixel circuit 10 and the first scan line SN1, which is electrically connected to the (i+1)-th row of the pixel circuit 10.

In the direction perpendicular to the plane of the base substrate, the second connection portion (L2) at least partially overlaps the reference voltage line (Ref), so that the second connection portion (L2) is electrically connected to the reference voltage line (Ref) through the first via hole K1, which passes between the first metal layer (i.e., the metal layer MC) and the second metal layer (i.e., the metal layer M2).

Similarly, in the direction perpendicular to the plane of the base substrate, the second connection portion (L2) also at least partially overlaps the first connection portion (L1), so that the second connection portion (L2) is electrically connected to the first connection portion (L1) through the second via hole (K2), which passes between the second metal layer (i.e., the metal layer M2) and the active layer (poly).

As shown in FIGS. 5 and 6, the first via hole (K1) can overlap the second via hole (K2). Therefore, a length of the second connection portion (L2) can be shortened, which can further save space occupied by the pixel circuits.

As shown in FIG. 5 and FIG. 6, the gate reset transistor T5 in the pixel circuit 10 may include a first sub-transistor (T51), a second sub-transistor (T52), and a third sub-transistor (T53). The first channel region C1 of the gate reset transistor T5 includes a first sub-channel region (C11) of the first sub-transistor T51, a second sub-channel region (C12) of the second sub-transistor T52, and a third sub-channel region (C13) of the third sub-transistor T53. In the direction perpendicular to the plane of the base substrate, the first sub-channel region (C11), the second sub-channel region (C12) and the third sub-channel region (C13) all overlap the first scan line (SN1). A portion where the first scan line (SN1) overlaps the first sub-channel region (C11) forms the gate of the first sub-transistor (T51), a portion where the first scan line (SN1) overlaps the second sub-channel region (C12) forms the gate of the second sub-transistor (T52), and a portion where the first scan line (SN1) overlaps the third sub-channel region (C13) forms the gate of the third sub-transistor (T53).

As shown in FIGS. 5 and 6, one end of the first sub-channel region (C11) is directly connected to the first connection portion (L1), and the other end of the first sub-channel region (C11) is directly connected to one end of the second sub-channel region (C12) through the first sub-connection portion (D1) on the active layer (poly). The other end of the second sub-channel region (C12) is directly connected to one end of the third sub-channel region (C13) through a second sub-connection portion (D2) in the active layer poly.

As shown in FIGS. 1, 5 and 6, the driving transistor (T3) includes a channel region (C30) in the active layer (poly) and a gate (g3) in the metal layer (M1). In the direction perpendicular to the plane of the base substrate, the gate (g3) of the driving transistor (T3) overlaps the channel region (C30). As shown in FIG. 5, one end of the third sub-channel region (C13) in the gate reset transistor T5, which is away from the second sub-connection portion (D2), is electrically connected to the gate (g3) of the driving transistor (T3) through a connection portion (J1).

It can be seen from the above that the gate reset transistor (T5) includes a first sub-transistor (T51), a second sub-transistor (T52) and a third sub-transistor (T53). That is, the gate reset transistor (T5) is a transistor with a tri-gate structure, which helps reduce the size of the gate reset transistor (T5). A leakage current to the gate (g3) of the driving transistor (T3) maintains stability of the gate potential of the driving transistor (T3), which helps reduce screen shaking in the display panel under low-frequency driving.

As shown in FIGS. 5 and 6, in the direction perpendicular to the plane of the base substrate, the second sub-connection portion (D2) at least partially overlaps the reference voltage line (Ref). In other words, the reference voltage line (Ref) at least covers part of the second sub-connection portion (D2). The reference voltage signal (VRef) on the reference voltage line (Ref) is a constant voltage signal. Therefore, the second sub-connection portion (D2) and the reference voltage line (Ref) form a shielding capacitor. When a potential change on the first scan line (SN1) alters a charge in the first channel region (C1) of the gate reset transistor (T5), the charge can be stored in the shielding capacitor formed by the second sub-connection portion (D2) and the reference voltage line (Ref). Therefore, an impact on the gate potential of the driving transistor (T3) can be reduced, thereby maintaining the stability of the gate potential of the driving transistor (T3) and reducing screen shaking in the display panel under low-frequency driving. In addition, since the reference voltage line (Ref) can be located in the metal layer (MC), the reference voltage line (Ref) can also shield the second sub-connection portion (D2), which helps maintain the stability of the gate potential of the driving transistor (T3) and reduces screen shaking in the display panel under low-frequency driving.

As shown in FIG. 5 and FIG. 6, the display panel includes a plurality of first power supply voltage lines (PVDD). As shown in FIG. 3, the display panel also includes a plurality of light-emitting elements 30. The first power supply voltage lines (PVDD) are electrically connected to the light-emitting elements 30 through the pixel circuits 10.

As shown in FIG. 5, the first power supply voltage lines (PVDD) extend along the second direction (Y). As shown in FIG. 1 and FIG. 5, the first power supply voltage lines (PVDD) may be located in the metal layer (M2). As shown in FIG. 3 and FIG. 5, the first power supply voltage line (PVDD) is electrically connected to the first electrode of the first light-emitting control transistor (T1) through the connection portion (J2) and to one plate (Cst2) of the storage capacitor (Cst) through the connection portion (J3). The other plate of the storage capacitor (Cst) is the gate (g3) of the driving transistor (T3). The second electrode of the first light-emitting control transistor (T1) is electrically connected to the first electrode of the driving transistor (T3) in the active layer (poly). The second electrode of the driving transistor (T3) is electrically connected to a first electrode of the second light-emitting control transistor (T6) in the active layer (poly), and a second electrode of the second light-emitting control transistor (T6) is electrically connected to a first electrode of the anode reset transistor (T7) in the active layer (poly). The second electrode of the second light-emitting control transistor (T6) and the second electrode of the anode reset transistor (T7) are electrically connected to light emitting elements 30 through a connection portion (J4).

As shown in FIGS. 5 and 6, in the direction perpendicular to the plane of the base substrate, the second sub-connection portion (D2) at least partially overlaps the first power supply voltage line PVDD. In other words, in the direction perpendicular to the plane of the base substrate, the second sub-connection portion (D2) may at least partially overlap the reference voltage line (Ref) and/or the first power voltage line (PVDD). Similar to the overlapping of the second sub-connection portion (D2) with the reference voltage line (Ref) in the direction perpendicular to the plane of the base substrate, the second sub-connection portion (D2) also overlaps the first power voltage line (PVDD) in the direction perpendicular to the plane of the base substrate. The first power supply voltage signal (VPVDD) on the first power supply voltage line (PVDD) is a constant voltage signal. The second sub-connection portion (D2) and the first power supply voltage line (PVDD) can also form a shielding capacitor, which can reduce an impact on the gate of the driving transistor (T3), maintains the stability of the gate potential of the driving transistor (T3) and reduces screen shaking in the display panel under low-frequency driving. Since the first power supply voltage line (PVDD) can be on the metal layer (M2), the first power supply voltage line (PVDD) can also shield the second sub-connection portion (D2), which helps maintain the stability of the gate potential of the driving transistor T3 and reduce screen shaking in the display panel under low-frequency driving.

As shown in FIGS. 3 and 5, in the pixel circuit 10, the compensation transistor T4 may include a sub-transistor (T41) and a sub-transistor (T42). The sub-transistor T41 includes a channel region (C41) in the active layer (poly), and the sub-transistor (T42) includes a channel region (C42) in the active layer (poly).

As shown in FIG. 5, the third scan line (SN2) includes a main body portion (G3) extending in the first direction (X) and a protruding portion (G4) extending from the main body part (G3) in the second direction (Y).

As shown in FIG. 5, in the direction perpendicular to the plane of the base substrate, the channel region (C41) overlaps the protruding portion (G4) of the third scan line (SN2), and the overlapping portion forms the gate of the sub-transistor (T4). In the direction perpendicular to the plane of the base substrate, the channel region (C42) overlaps the main body portion (G3) of the third scan line (SN2), and the overlapping portion forms the gate of the sub-transistor (T42).

As shown in FIG. 5, one end of the channel region (C41) of the sub-transistor (T41) is electrically connected to the gate (g3) of the driving transistor (T3) through the connection portion (J1), while the other end of the channel region (C41) of the sub-transistor (T41), located in the active layer (poly), is electrically connected to one end of the channel region (C42) of the sub-transistor (T42). The other end of the channel region (C42) of the sub-transistor (T42) is electrically connected to the second electrode of the driving transistor (T3) in the active layer (poly).

Since the compensation transistor (T4) includes a sub-transistor (T41) and a sub-transistor (T42), the compensation transistor (T4) is a transistor with a double-gate structure, which is conducive to reducing current leakage from the compensation transistor (T4) to the gate of the driving transistor (T3), thereby maintaining the stability of the gate potential of the driving transistor (T3) and reducing screen shaking in the display panel under low-frequency driving.

As shown in FIG. 3 and FIG. 5, the display panel includes a plurality of data lines (data) extending along the second direction (Y). The first electrode of the data writing transistor (T2) in the pixel circuit 10 is electrically connected to the data line (data) through the connection portion (J5), and the second electrode of the data writing transistor (T2) is electrically connected to the first electrode of the driving transistor (T3) in the active layer (poly).

Figure 7:
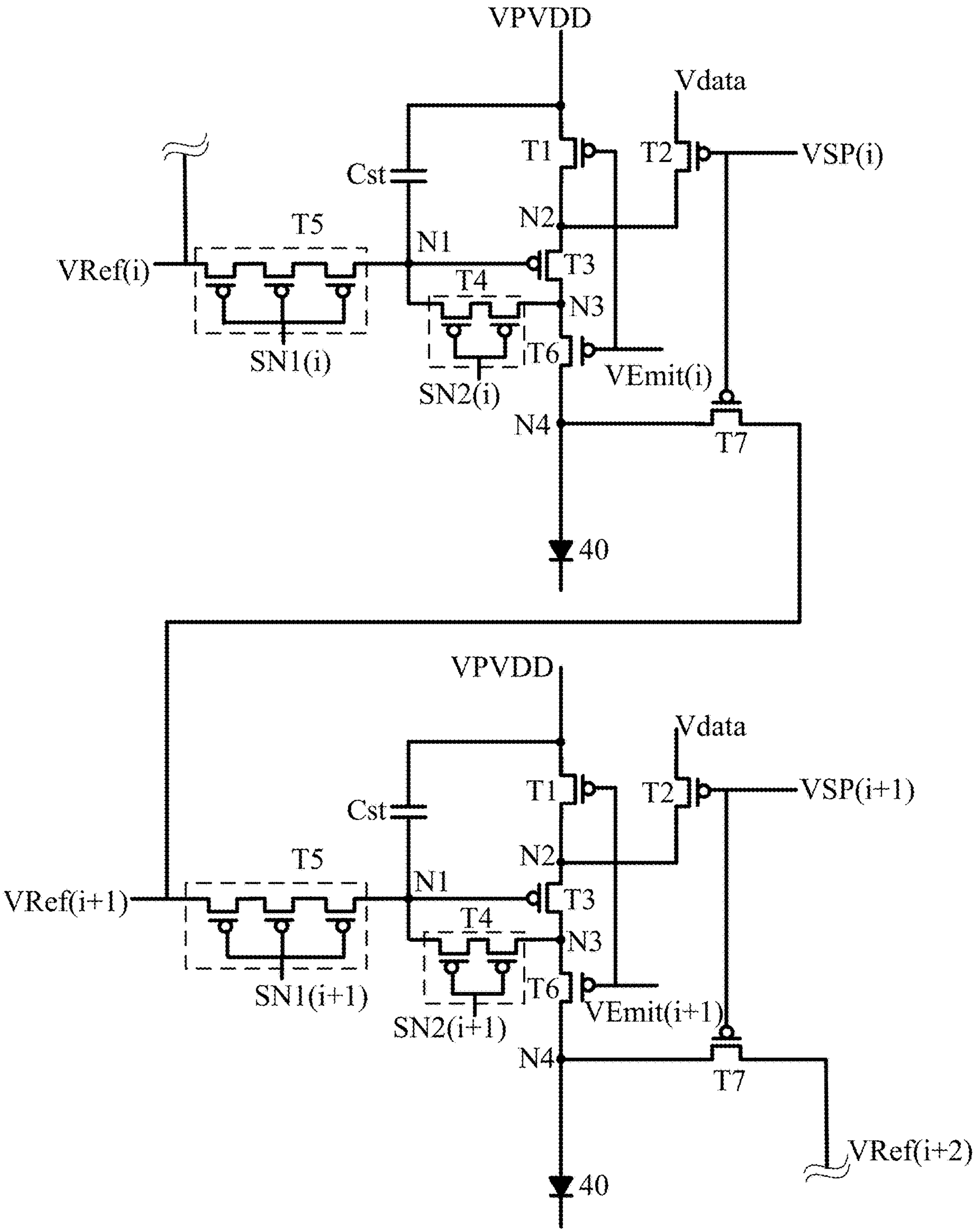
FIG. 7 illustrates a circuit diagram of two adjacent rows of pixel circuits in a same column of pixel circuits shown in FIG. 5.

FIG. 7 illustrates a circuit diagram of two adjacent rows of pixel circuits in a same column of pixel circuits shown in FIG. 5. As shown in FIG. 5 and FIG. 7, the reference voltage line (Ref) is electrically connected to both the anode reset transistor (T7) in the i-th row of pixel circuits 10 and to the gate reset transistor (T5) in the (i+1)-th row of pixel circuits 10 in a same column of pixel circuits. Therefore, the reference voltage signal (VRef) on the reference voltage line (Ref) can reset both the fourth node (N4) of the i-th row of pixel circuits 10 through the anode reset transistor (T7) in the i-th row of pixel circuits 10 and the first node (N1) in the (i+1)-th row of pixel circuits 10 through the gate reset transistor (T5) in the (i+1)-th row of pixel circuits 10 in a same column of pixel circuits.

As shown in FIG. 5 and FIG. 7, in the pixel circuit 10, the gate reset transistor (T5) is a transistor with a tri-gate structure and includes three sub-transistors, while the compensation transistor (T4) is a transistor with a double-gate structure and includes two sub-transistors.

Figure 8:
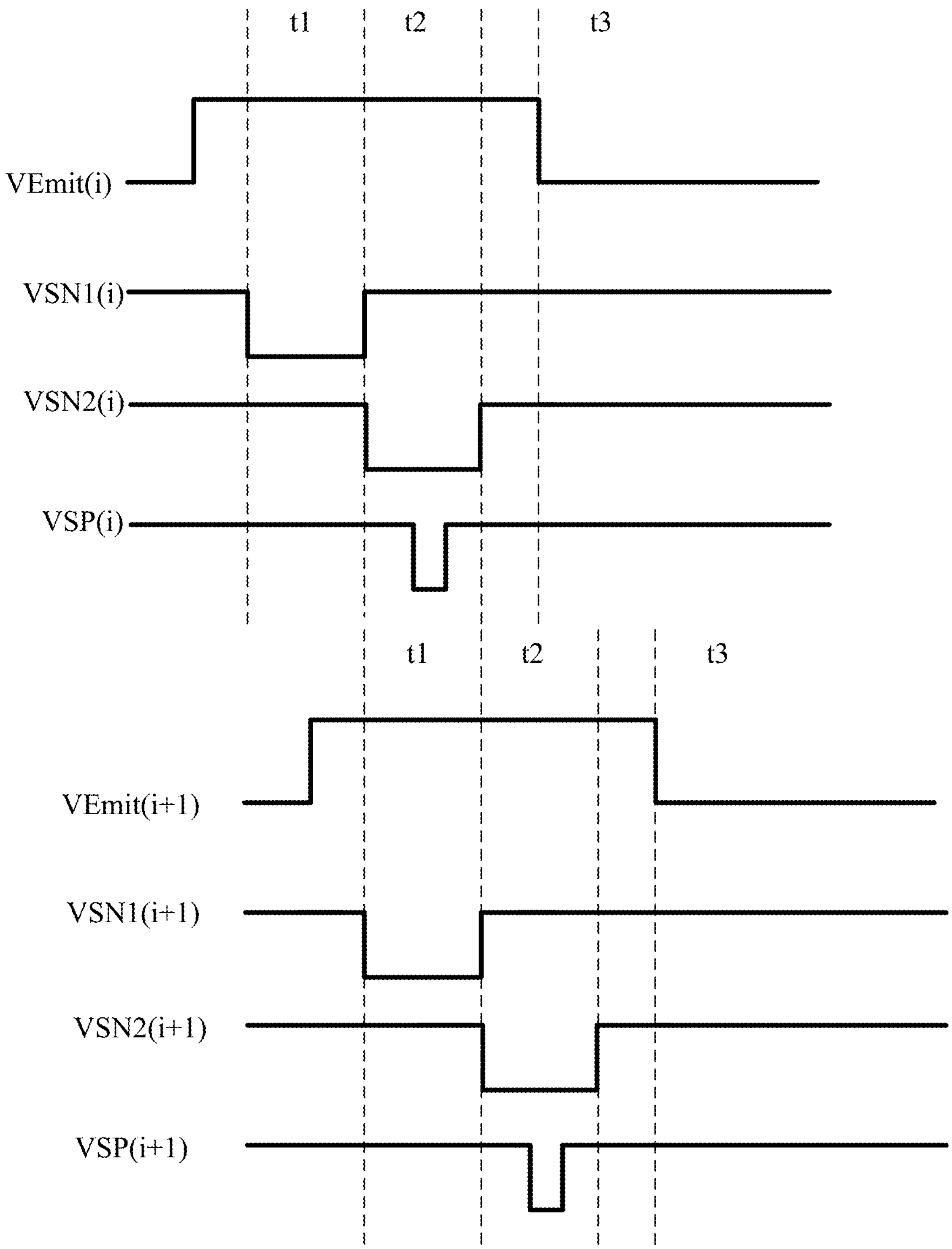
FIG. 8 illustrates a timing diagram of signals provided to two adjacent rows of pixel circuits in a same column of pixel circuits shown in FIG. 7.

FIG. 8 illustrates a timing diagram of signals provided to two adjacent rows of pixel circuits 10 in a same column of pixel circuits shown in FIG. 7. As shown in FIGS. 5, 7 and 8, in a same column of pixel circuits, the first scan signal (VSN1(*i*)) that drives the i-th row of pixel circuits 10 is at an active level, the i-th row of pixel circuits 10 enters the period (t1), and the gate reset transistor (T5) in the i-th row of pixel circuit 10 is turned on, so that the reference voltage signal (VRef(i)) provided by the reference voltage line (Ref), which is electrically connected to the gate reset transistor (T5) in the i-th row of pixel circuits 10, resets the first node (N1) in the i-th row of pixel circuits 10.

The third scan signal (VSN2(*i*)) driving the i-th row of pixel circuits 10 is at an active level, the i-th row of pixel circuits 10 enters the (t2) period, and the compensation transistor (T4) in the i-th row of pixel circuits 10 is turned on. The second scan signal (VSP(i)) driving the i-th row of pixel circuits 10 is at an active level, so that the data writing transistor (T2) of the i-th row of pixel circuits 10 is turned on, and a data signal is written to the gate of the driving transistor (T3) in the i-th row of pixel circuits 10. The second scan signal (VSP(i)) driving the i-th row of pixel circuits 10 is at an active level, so that the anode reset transistor (T7) of the i-th row of pixel circuits 10 is also turned on to reset the fourth node (N4) of the i-th row of pixel circuits 10. The first scan signal (VSN1(*i*+1)) driving the (i+1)-th row of pixel circuits 10 is at an active level, the (i+1)-th row of pixel circuits 10 enters the (t1) period, the gate reset transistor T5 in the (i+1)-th row of pixel circuits 10 is turned on, so that the reference voltage signal (VRef(i+1)) provided by the reference voltage line (Ref), which is electrically connected to the gate reset transistor (T5) in the (i+1)-th row of pixel circuits 10, resets the first node (N1) in the (i+1)-th row of pixel circuits 10.

The light-emitting control signal (VEmit) that drives the i-th row of pixel circuits 10 is at an active level, so that the i-th row of pixel circuits 10 enters the t3 period and drive the light-emitting element 40 to emit light. Moreover, the (i+1)-th row of pixel circuits also sequentially enters the (t2) period and the (t3) period.

When the second scan signal (VSP(i)) driving the i-th row of pixel circuits 10 and the first scan signal (VSN1(*i*+1)) driving the i+1-th row pixel circuit 10 are both at an active level, that is, when the anode reset transistor (T7) in the i-th row of pixel circuits 10 and the gate reset transistor (T5) in the (i+1)-th row of pixel circuits 10 are turned on at a same time, the reference voltage signal (VRef) on the reference voltage line (Ref) can reset both the fourth node (N4) in the i-th row of pixel circuits 10 through the anode reset transistor (T7) in the i-th row of pixel circuits 10, and the first node (N1) in the (i+1)-th row of pixel circuits 10 through the gate reset transistor (T5) in the (i+1)-th row of pixel circuits 10.

An active level period of the second scan signal (VSP(i)), which drives the i-th row of pixel circuits 10, may not overlap an active level period of the first scan signal (VSN1 (*i*+1)), which drives the (i+1)-th row of pixel circuits 10. The anode reset transistor (T7) in the i-th row of pixel circuits 10 and the gate reset transistor (T5) in the (i+1)-th row of pixel circuits 10 are turned on in a time-sharing manner. The reference voltage signal (VRef) on the reference voltage line (Ref) resets the fourth node (N4) in the i-th row of pixel circuits 10 through the anode reset transistor (T7) in the i-th row of pixel circuits 10, and resets the first node (N1) in the (i+1)-th row pixel circuit 10 through the gate reset transistor (T5) in the (i+1)-th row of pixel circuits 10 in a time-sharing manner.

Figure 9:
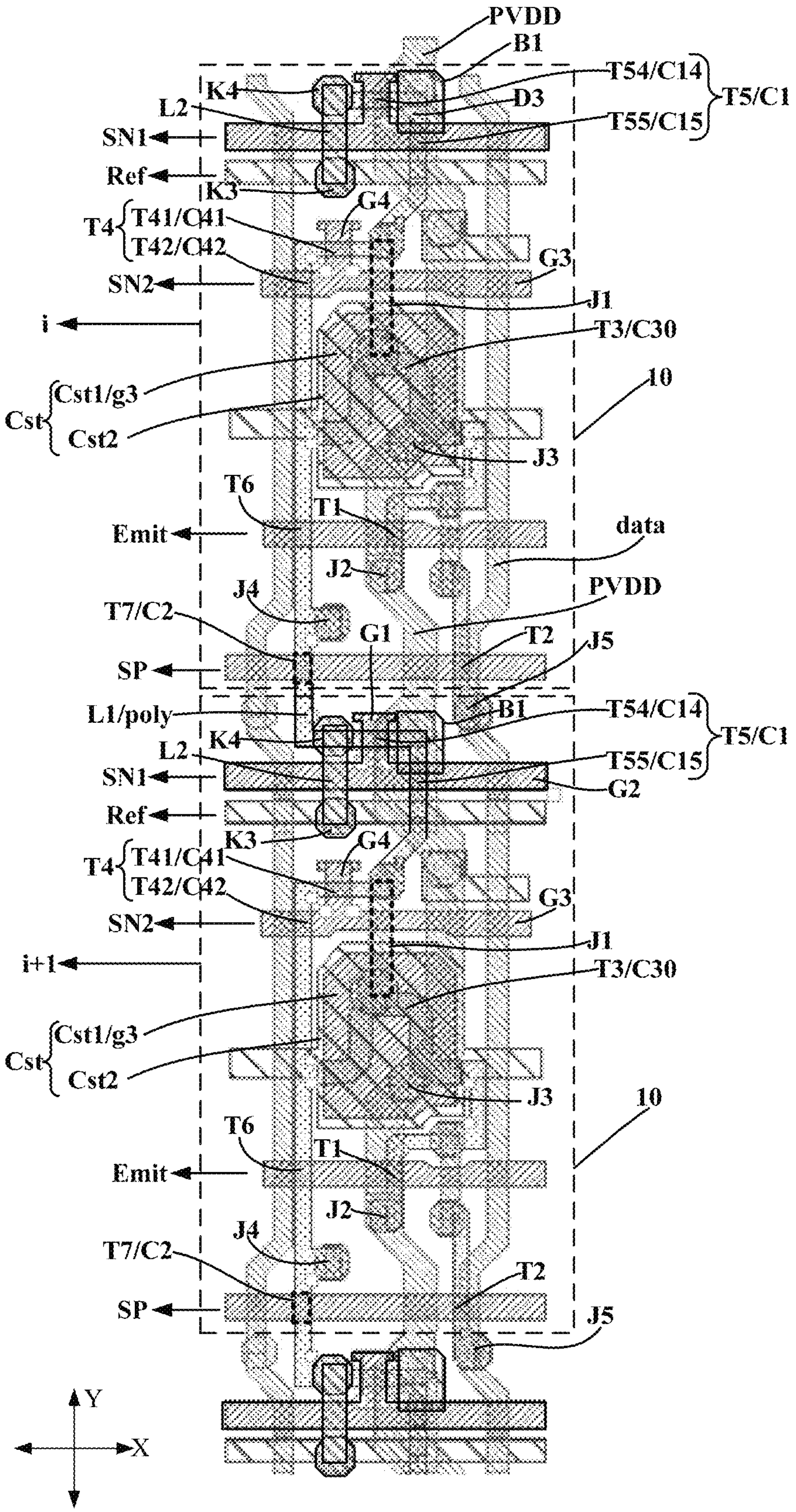
FIG. 9 illustrates a layout diagram of two adjacent rows of pixel circuits within a column of pixel circuits in another display panel consistent with various embodiments of the present disclosure.

FIG. 9 illustrates a layout diagram of two adjacent rows of pixel circuits 10 in a column of pixel circuits within another display panel consistent with various embodiments of the present disclosure. As shown in FIGS. 1, 3 and 9, the pixel circuit 10 includes a gate reset transistor (T5) and an anode reset transistor (T7). The gate reset transistor (T5) includes a first channel region (C1) in the active layer (poly). In the direction perpendicular to a plane of the base substrate (sub), the first channel region (C1) overlaps the first scan line (SN1), and the overlapping portion forms the gate of the gate reset transistor (T5). The anode reset transistor (T7) includes a second channel region (C2) in the active layer (poly). In the direction perpendicular to a plane of the base substrate (sub), the second channel region C2 overlaps the second scan line SP, and the overlapping portion forms the gate of the anode reset transistor (T7).

Figure 10:
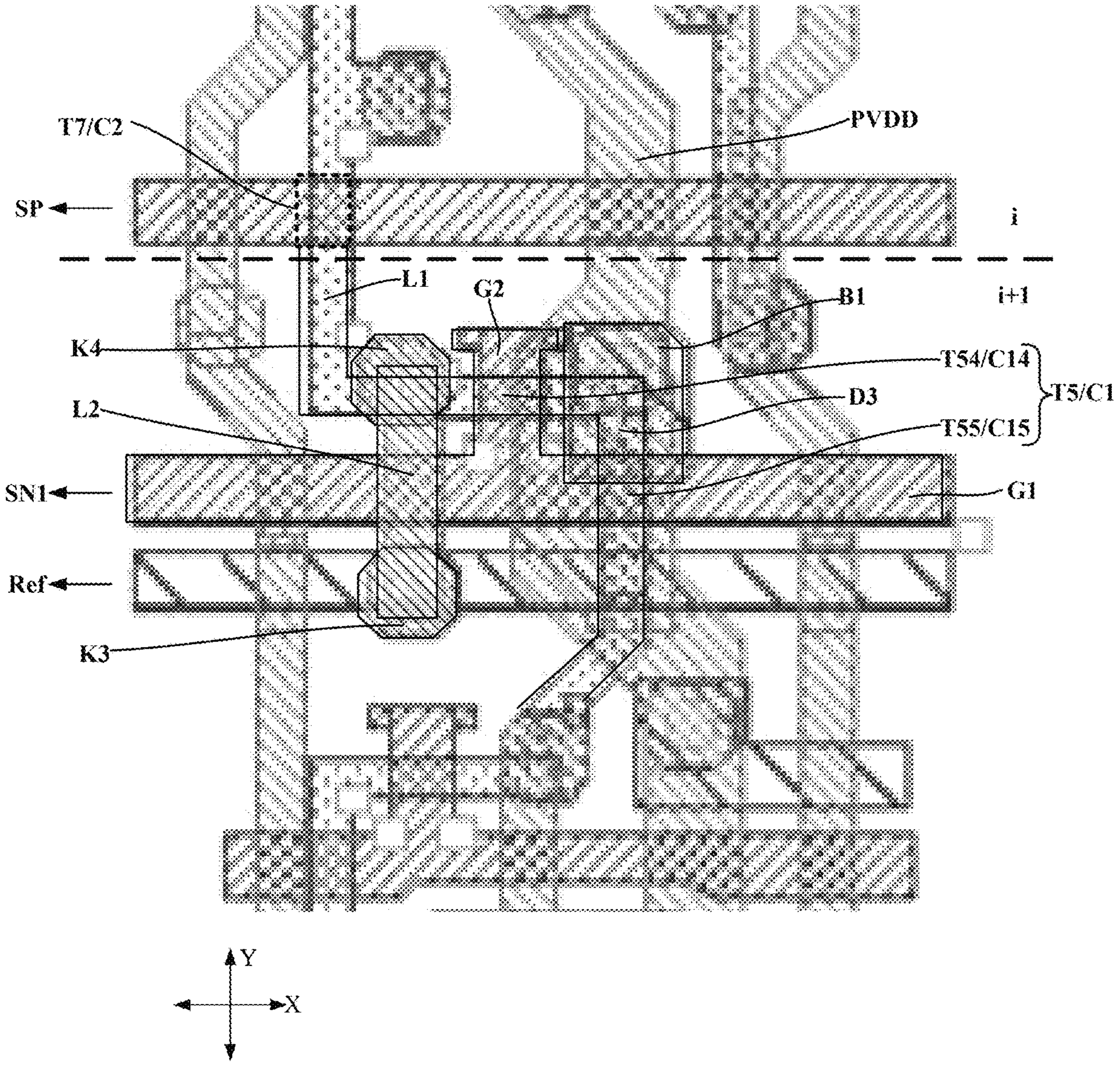
FIG. 10 illustrates an enlarged schematic diagram of a specific area shown in FIG. 9.

To better understand the present disclosure, FIG. 10 illustrates an enlarged schematic diagram of a specific area shown in FIG. 9. As shown in FIGS. 9 and 10, in a same column of pixel circuits, the second channel region (C2) of the anode reset transistor (T7) in the i-th row of pixel circuits 10 is directly connected to the first channel region (C1) of the gate reset transistor (T5) in the (i+1)-th row of pixel circuits through the first connection portion (L1) in the active layer (poly). That is, in a same column of pixel circuits 10, the second channel region (C2) of the anode reset transistor (T7) in the i-th row of pixel circuits 10 is directly connected to the first connection portion (L1) in the active layer (poly). In a same column of pixel circuits 10, the first channel region (C1) of the gate reset transistor (T5) in the (i+1)-th row of pixel circuits 10, located in the active layer poly, is directly connected to the first connection portion (L1). Therefore, in a same column of pixel circuits 10, the second channel region (C2) of the anode reset transistor (T7) in the i-th row of pixel circuits 10 is directly connected to the first channel region (C1) of the gate reset transistor (T5) in the (i+1)-th row of pixel circuits through the first connection portion (L1) of a same layer. In other words, in a same column of pixel circuits, the second channel region (C2) of the anode reset transistor (T7) in the i-th row of pixel circuits 10 is directly connected to the first channel region (C1) of the gate reset transistor (T5) in the (i+1)-th row of pixel circuits 10 through the first connection portion (L1) in the active layer (poly), where i is a positive integer.

Moreover, as shown in FIGS. 9 and 10, the first connection portion (L1) is electrically connected to the reference voltage line (Ref). Therefore, the reference voltage line (Ref) can be electrically connected to the anode reset transistor (T7) in the i-th row of pixel circuits 10 and the gate reset transistor (T5) in the (i+1)-th row of pixel circuits 10 in a same column of pixel circuits through the first connection portion (L1).

Therefore, number of holes electrically connected to the reference voltage line (Ref), the anode reset transistor (T7) in the i-th row of pixel circuits 10, and the gate reset transistor (T5) in the (i+1)-th row of pixel circuits in a same column of pixel circuits can be reduced, thereby saving space occupied by the pixel circuits 10. If the pixel circuits 10 operate in a low-frequency driving mode, the space occupied by the low-frequency pixel circuits can be further reduced, which is conducive to the development of display panels with high pixel density and high resolution.

As shown in FIGS. 1, 9 and 10, the first scan line (SN1) may be located on the metal layer (M1), and the second scan line (SP) may also be located on the metal layer (M1). As shown in FIGS. 1, 9 and 10, the reference voltage line (Ref) may be located on the first metal layer, which is on a side of the active layer (poly) facing away from the base substrate (sub). The first metal layer may be the metal layer (MC), and the first connection portion (L2) may be in the active layer (poly). Therefore, the reference voltage line (Ref) and the first connection portion (L1) are arranged in different layers.

As shown in FIG. 1, FIG. 9 and FIG. 10, the reference voltage line (Ref) is electrically connected to the first connection portion (L1) through the second connection portion (L2). The second connection portion (L2) is on the second metal layer, which is on a side of the first metal layer facing away from the base substrate (sub). Optionally, the first metal layer is the metal layer (MC), and the second metal layer is the metal layer (M2). The metal layer (M2) is located on a side of the metal layer (MC) facing away from the base substrate (sub). The reference voltage line (Ref) on the metal layer (MC) is electrically connected to the first connection portion (L1) in the active layer (poly) through the second connection portion (L2) on the metal layer (M2).

It can be understood that the reference voltage line (Ref) is electrically connected to the second connection portion (L2) through a via hole between the first metal layer (i.e., metal layer (MC)) and the second metal layer (i.e., metal layer (M2)). The second connection portion L2 is electrically connected to the first connection portion L1 through a via hole between the second metal layer (i.e., the metal layer M2) and the active layer (poly). The first connection portion (L1), located in the active layer (poly), is electrically connected to the second channel region (C2) of the anode reset transistor (T7) in the i-th row of pixel circuits 10 and to the first channel region (C1) of the gate reset transistor (T5) in the (i+1)-th row pixel circuit in a same column of pixel circuits. Therefore, in a same column of pixel circuits, the reference voltage line (Ref) only needs to pass through two via holes to transmit the reference voltage signal (VRef) to the second channel region (C2) of the anode reset transistor (T7) in the i-th row of pixel circuits 10 and to the first channel region (C1) of the gate reset transistor (T5) in the (i+1)-th row of pixel circuits.

As shown in FIG. 9, a row of pixel circuits 10 is electrically connected to a first scan line (SN1) and a second scan line (SP). The first scan lines (SN1) and the second scan lines (SP) are alternately arranged along the second direction (Y). Along the second direction (Y), the reference voltage line (Ref) is located on a side of the first scan line (SN1) that is electrically connected to the (i+1)-th row of pixel circuits 10 and is away from the second scan line (SP), which is electrically connected to the i-th row of pixel circuits 10. Therefore, along the second direction (Y), the first scan lines (SN1), the reference voltage lines (Ref) and the second scan lines (SN2) are arranged in sequence.

As shown in FIGS. 9 and 10, in a same column of pixel circuits, the second channel region (C2) of the anode reset transistor (T5) in the i-th row of pixel circuits 10 and the first channel region (C1) of the gate reset transistor (T5) in the (i+1)-th row of pixel circuits 10 are on a same side of the reference voltage line (Ref) along the second direction (Y). The above arrangement not only facilitates a direct connection between the second channel region (C2) of the anode reset transistor (T5) in the i-th row of pixel circuits 10 and the first channel region (C1) of the gate reset transistor (T5) in the (i+1)-th row of pixel circuits 10 in a same column of pixel circuits through the first connection portion (L1) on the active layer poly but also helps shorten a length of the first connection portion (L1) and further saves space occupied by the pixel circuits.

As shown in FIGS. 9 and 10, one end of the second connection portion (L2) is electrically connected to the reference voltage line (Ref) through a third via hole (K3). The other end of the second connection portion (L2) is electrically connected to the first connection portion (L1) through a fourth via hole (K4). Along the second direction (Y), the third via hole K3 and the fourth via hole (K4) are on opposite sides of the first scan line SN1, which is electrically connected to the (i+1)-th row of pixel circuits 10.

It can be understood that, in the direction perpendicular to the plane of the base substrate, the second connection portion (L2) at least partially overlaps the reference voltage line (Ref). Therefore, the second connection portion (L2) is electrically connected to the reference voltage line (Ref) through the third via hole (K3) between the first metal layer (i.e., metal layer (MC)) and the second metal layer (i.e., metal layer (M2)).

Similarly, in the direction perpendicular to the plane of the base substrate, the second connection portion (L2) also at least partially overlaps the first connection portion (L1). Therefore, the second connection portion (L2) is electrically connected to the first connection portion (L1) through the fourth via (K4) between the second metal layer (i.e., the metal layer (M2)) and the active layer (poly).

Since the reference voltage line (Ref) is located on a side of the first scan line (SN1), which is electrically connected to the (i+1)-th row of pixel circuits 10 and away from the second scan line (SP) electrically connected to the i-th row of pixel circuits 10, and because the second channel region (C2) of the anode reset transistor (T5) in the i-th row of pixel circuits 10 and the first channel region (C1) of the gate reset transistor (T5) in the (i+1)-th row of pixel circuits 10 in a same column of pixel circuits are located on a same side of the reference voltage line (Ref) along the second direction (Y), the second connection portion (L2) needs to be electrically connected to the reference voltage line (Ref) across the first scan line (SN1). The third via hole (K3), which is electrically connected to the second connection portion (L2) and the reference voltage line (Ref), and the fourth via hole (K4) which is electrically connected to the second connection portion (L2) and the first connection portion (L1), are on opposite sides of the first scan line (SN1), which is electrically connected to the (i+1)-th row of pixel circuits 10 along the second direction (Y).

As shown in FIGS. 9 and 10, the first scan line (SN1) includes a main body part (G1), which extends along the first direction (X), and a first protruding part (G2), which extends from the main body part G1 along the second direction (Y).

As shown in FIG. 9 and FIG. 10, the gate reset transistor (T5) includes a fourth sub-transistor (T54) and a fifth sub-transistor (T55). The first channel region (C1) of the gate reset transistor (T5) includes a fourth sub-channel region (C14) of the fourth sub-transistor (T54) and a fifth sub-channel region (C15) of the fifth sub-transistor (T55). In the direction perpendicular to the plane of the base substrate, the fourth sub-channel region (C14) overlaps the first protruding portion (G2) of the first scan line (SN1), and the fifth sub-channel region (C15) overlaps the main body portion (G1) of the first scan line (SN1). The portion where the first protruding portion (G2) of the first scan line (SN1) overlaps the fourth sub-channel region (C14) forms the gate of the fourth sub-transistor (T54). The portion where the main body portion (G1) of the first scan line (SN1) overlaps the fifth sub-channel (C15) forms the gate of the fifth sub-transistor (T55).

As shown in FIGS. 9 and 10, one end of the fourth sub-channel region (C14) is directly connected to the first connection portion (L1), while the other end of the fourth sub-channel region (C14) is directly connected to one end of the fifth sub-channel region (C15) through a third sub-connection portion (D3) in the active layer (poly).

As shown in FIGS. 1, 5 and 6, the driving transistor (T3) includes a channel region (C30) in the active layer (poly) and a gate (g3) in the metal layer M1. In the direction perpendicular to the plane of the base substrate, the gate (g3) of the driving transistor (T3) overlaps the channel region (C30). As shown in FIG. 9, one end of the fifth sub-channel region (C15) in the gate reset transistor (T5), which is away from the third sub-connection portion (D3), is electrically connected to the gate (g3) of the driving transistor (T3) through the connection portion (J1).

It can be seen from the above that the gate reset transistor (T5) includes a fourth sub-transistor (T54) and a fifth sub-transistor (T55), that is, the gate reset transistor (T5) is a transistor with a double-gate structure, which is conducive to reducing current leakage from the gate reset transistor (T5) to the gate (g3) of the driving transistor (T3), thereby maintaining the stability of a gate potential of the driving transistor (T3), and reducing screen shaking in the display panel under low-frequency driving.

As shown in FIGS. 1, 9 and 10, the pixel circuit 10 further includes a first shielding portion (B1) on a side of the active layer (poly) facing away from the base substrate. Optionally, the first shielding portion (B1) is in the metal layer (MC).

As shown in FIGS. 9 and 10, in the direction perpendicular to the plane of the base substrate, the third sub-connection (D3) at least partially overlaps the first shielding portion (B1), meaning that the first shielding portion (B1) covers at least part of the third sub-connection portion (D3). Therefore, the third sub-connection portion (D3) and the first shield part (B1) form a shielding capacitor. When a potential change on the first scan line SN1 causes a change in the charge of the first channel region (C1) of the gate reset transistor (T5), the charge in the first channel region (C1) of the gate reset transistor (T5) can be stored in the shielding capacitor formed by the third sub-connection portion (D3) and the first shielding portion (B1), which reduces an influence on the gate potential of the driving transistor (T3), maintains a stability of the gate potential of the driving transistor (T3), and reduces screen shaking in the display panel under low-frequency driving. Additionally, since the first shielding portion (B1) can be in the metal layer (MC), the first shielding portion (B1) can further shield the third sub-connection portion (D3), which is also conducive to maintaining the stability of the gate potential of the driving transistor (T3) and reducing screen shaking in the display panel under low-frequency driving.

As shown in FIG. 9 and FIG. 10, the display panel includes a plurality of first power supply voltage lines (PVDD). Referring to FIG. 3, the display panel also includes a plurality of light-emitting elements (30), and the plurality of first power supply voltage lines PVDD is electrically connected to the plurality of light-emitting elements 30 through the pixel circuits 10.

As shown in FIG. 9, the first power supply voltage lines (PVDD) extend along the second direction (Y). As shown in FIG. 1 and FIG. 9, the first power supply voltage lines (PVDD) may be in the metal layer (M2). As shown in FIG. 3 and FIG. 9, the first power supply voltage line (PVDD) is electrically connected to the first electrode of the first light-emitting control transistor (T1) through the connection portion (J2) and to one plate (Cst2) of the storage capacitor (Cst) through the connection portion (J3). The other plate of the storage capacitor (Cst) is the gate (g3) of the driving transistor (T3). The second electrode of the first light-emitting control transistor (T1) is electrically connected to the first electrode of the driving transistor (T3) in the active layer (poly). The second electrode of the driving transistor (T3) is electrically connected to the first electrode of the second light-emitting control transistor (T6) in the active layer (poly), and the second electrode of the second light-emitting control transistor (T6) is electrically connected to the first electrode of the anode reset transistor (T7) in the active layer (poly). The second electrode of the second light emission control transistor (T6) and the second electrode of the anode reset transistor (T7) are electrically connected to the light-emitting element 30 through the connection portion (J4).

As shown in FIGS. 9 and 10, in the direction perpendicular to the plane of the base substrate, the third sub-connection portion (D3) at least partially overlaps the first power supply voltage line (PVDD). That is, in the direction perpendicular to the plane of the base substrate, the third sub-connection portion (D3) may at least partially overlap the first shielding portion (B1) and/or the first power voltage line (PVDD). Similar to the overlapping of the third sub-connection portion (D3) with the first shielding portion (B1) in the direction perpendicular to the plane of the base substrate, the third sub-connection portion (D3) overlaps the first power supply voltage line (PVDD) in the direction perpendicular to the plane of the base substrate. The first power supply voltage signal (VPVDD) on the first power supply voltage line (PVDD) is a constant voltage signal. The third sub-connection portion (D2) and the first power supply voltage line (PVDD) can also form a shielding capacitor, which can reduce an impact on the gate potential of the driving transistor (T3), maintain the stability of the gate potential of the driving transistor (T3), and reduces screen shaking in the display panel under low-frequency driving. Moreover, since the first power supply voltage line (PVDD) can be in the metal layer (M2), the first power supply voltage line (PVDD) can also shield the third sub-connection portion (D3), which is also conducive to maintaining the stability of the gate potential of the driving transistor (T3) and reducing screen shake in the display panel under low-frequency driving.

As shown in FIGS. 1, 3 and 9, in the pixel circuit 10, the compensation transistor (T4) may include a sub-transistor (T41) and a sub-transistor (T42). The sub-transistor T41 includes a channel region (C41) in the active layer (poly), while the sub-transistor (T42) includes a channel region (C42) in the active layer (poly). As shown in FIG. 9, the third scan line (SN2) includes a main body portion (G3) extending in the first direction (X) and a protruding portion (G4) extending from the main body part (G3) in the second direction (Y).

As shown in FIG. 9, in the direction perpendicular to the plane of the base substrate, the channel region (C41) overlaps the protruding portion (G4) of the third scan line (SN2), and the overlapping portion forms the gate of the sub-transistor (T41). In a direction perpendicular to the plane of the base substrate, the channel region (C42) overlaps the main body portion (G3) of the third scan line (SN2), and the overlapping portion forms the gate of the sub-transistor (T42).

As shown in FIG. 9, one end of the channel region (C41) of the sub-transistor (T41) is electrically connected to the gate (g3) of the driving transistor (T3) through the connection portion (J1). The other end of the channel region (C41) of the sub-transistor (T41) is electrically connected to one end of the channel region (C42) of the sub-transistor (T42) in the active layer (poly). The other end of the channel region (C42) of the sub-transistor (T42) is electrically connected to the second electrode of the driving transistor (T3) in the active layer (poly).

Since the compensation transistor (T4) includes a sub-transistor (T41) and a sub-transistor (T42), the compensation transistor (T4) is a transistor with a double-gate structure, which is conducive to reducing the leakage current from the compensation transistor (T4) to the gate of the driving transistor (T3), thereby maintaining the stability of the gate potential of the driving transistor (T3) and reducing screen shaking in the display panel under low-frequency driving.

As shown in FIG. 3 and FIG. 9, the display panel includes a plurality of data lines (data) extending along the second direction (Y). The first electrode of the data writing transistor (T2) in the pixel circuit 10 is electrically connected to the data line (data) through the connection portion (J5), while the second electrode of the data writing transistor (T2) is electrically connected to the first electrode of the driving transistor (T3) in the active layer (poly). As shown in FIG. 1 and FIG. 9, the data lines (data) may be located in the metal layer (M2).

Figure 11:
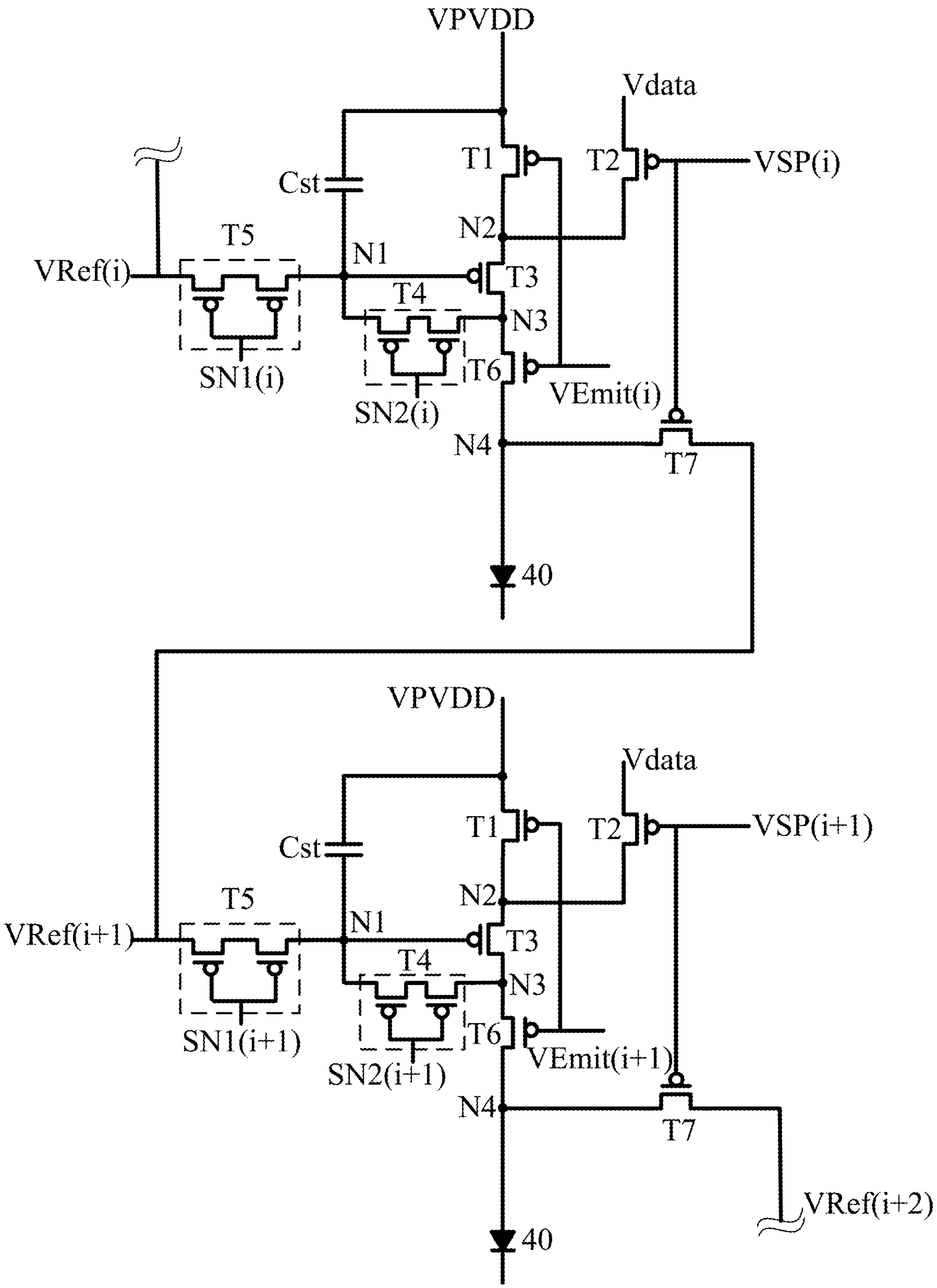
FIG. 11 illustrates a circuit diagram of two adjacent rows of pixel circuits in a same column of pixel circuits shown in FIG. 9.

FIG. 11 illustrates a circuit diagram of two adjacent rows of pixel circuits 10 in a same column of pixel circuits shown in FIG. 9. As shown in FIGS. 9 and 11, a reference voltage line (Ref) is electrically connected to both the anode reset transistor (T7) of the i-th row of pixel circuits 10 and to the gate reset transistor (T5) of the (i+1)-th row of pixel circuits 10 in a same column of pixel circuits. Therefore, the reference voltage signal (VRef) on the reference voltage line (Ref) can reset the fourth node (N4) of the i-th row of pixel circuits 10 through the anode reset transistor (T7) of the i-th row of pixel circuits 10, and the first node (N1) of the (i+1)-th row of pixel circuits 10 through the gate reset transistor (T5) of the (i+1)-th row of pixel circuits 10 in a same column of pixel circuits.

As shown in FIGS. 9 and 11, in the pixel circuit 10, the gate reset transistor (T5) is a transistor with a double-gate structure and includes two sub-transistors. The compensation transistor (T4) is also a transistor with a double-gate structure and includes two sub-transistors.

FIG. 8 also illustrates a timing diagram of two adjacent rows of pixel circuits 10 in a same column of pixel circuits, as shown in FIG. 11. Referring to FIG. 8, FIG. 9 and FIG. 11, in a same column of pixel circuits, the first scan signal (VSN1(*i*)) that drives the i-th row of pixel circuits 10, is at an active level, the i-th row of pixel circuits 10 enters the (t1) period, and the gate reset transistor (T5) in the i-th row of pixel circuits 10 is turned on, so that the reference voltage signal (VRef(i)) provided by the reference voltage line (Ref), which is electrically connected to the gate reset transistor (T5) in the i-th row of pixel circuits 10, resets the first node (N1) in the i-th row of pixel circuits 10.

The third scan signal (VSN2(*i*)) that drives the i-th row of pixel circuits 10 is at an active level, the i-th row of pixel circuits 10 enters the (t2) period, and the compensation transistor (T4) in the i-th row of pixel circuits 10 is turned on. Furthermore, the second scan signal (VSP(i)) that drives the i-th row of pixel circuits 10 is at an active level, so that the data writing transistor (T2) of the i-th row of pixel circuits 10 is turned on, and a data signal is written to the gate of the driving transistor (T3) of the i-th row of pixel circuits 10. The second scan signal (VSP(i)) that drives the i-th row of pixel circuits 10 is at an active level and the anode reset transistor (T7) in the i-th row of pixel circuits 10 is also turned on to reset the fourth node (N4) of the i-th row of pixel circuits 10. The first scan signal (VSN1(*i*+1)) that drives the (i+1)-th row of pixel circuits 10 is at an active level, the (i+1)-th row of pixel circuits 10 enters the (t1) period, and the gate reset transistor (T5) in the (i+1)-th row of pixel circuits 10 is turned on, so that the reference voltage signal (VRef(i+1)) provided by the reference voltage line (Ref), which is electrically connected to the (i+1)-th row of pixel circuits 10), resets the first node (N1) in the (i+1)-th row of pixel circuits 10.

The light-emitting control signal (VEmit) that drives the i-th row of pixel circuits 10 is at an active level, so that the i-th row of pixel circuits 10 enters the (t3) period and drives the light-emitting element 40 to emit light. Moreover, the (i+1)-th row of pixel circuit also enters the (t2) period and the (t3) period in sequence.

Therefore, when the second scan signal (VSP(i)) that drives the i-th row of pixel circuits 10 and the first scan signal (VSN1(*i*+1)) that drives the (i+1)-th row of pixel circuits 10 are both at an active level, that is, when the anode reset transistor (T7) in the i-th row of pixel circuits 10 and the gate reset transistor (T5) in the (i+1)-th row of pixel circuits 10 are turned on at a same time, the reference voltage signal (VRef) on the reference voltage line (Ref) can reset the fourth node (N4) in the i-th row of pixel circuits 10 through the anode reset transistor (T7) in the i-th row of pixel circuits 10, and the first node (N1) in the (i+1)-th row of pixel circuits 10 through the gate reset transistor (T5) in the (i+1)-th row of pixel circuits 10.

An active level period of the second scan signal (VSP(i)) that drives the i-th row of pixel circuits 10 may not overlap an active level period of the first scan signal (VSN1(*i*+1)) that drives the (i+1)-th row of pixel circuits 10. The anode reset transistor (T7) in the i-th row of pixel circuits 10, and the gate reset transistor (T5) in the (i+1)-th row of pixel circuits 10 are turned on in a time-sharing manner. The reference voltage signal (VRef) on the reference voltage line (Ref) resets the fourth node (N4) in the i-th row of pixel circuits 10 through the anode reset transistor (T7) in the i-th row of pixel circuits 10, and resets the first node (N1) in the (i+1)-th row of pixel circuits 10 through the gate reset transistor (T5) in the (i+1)-th row of pixel circuits 10 in a time-sharing manner.

Figure 12:
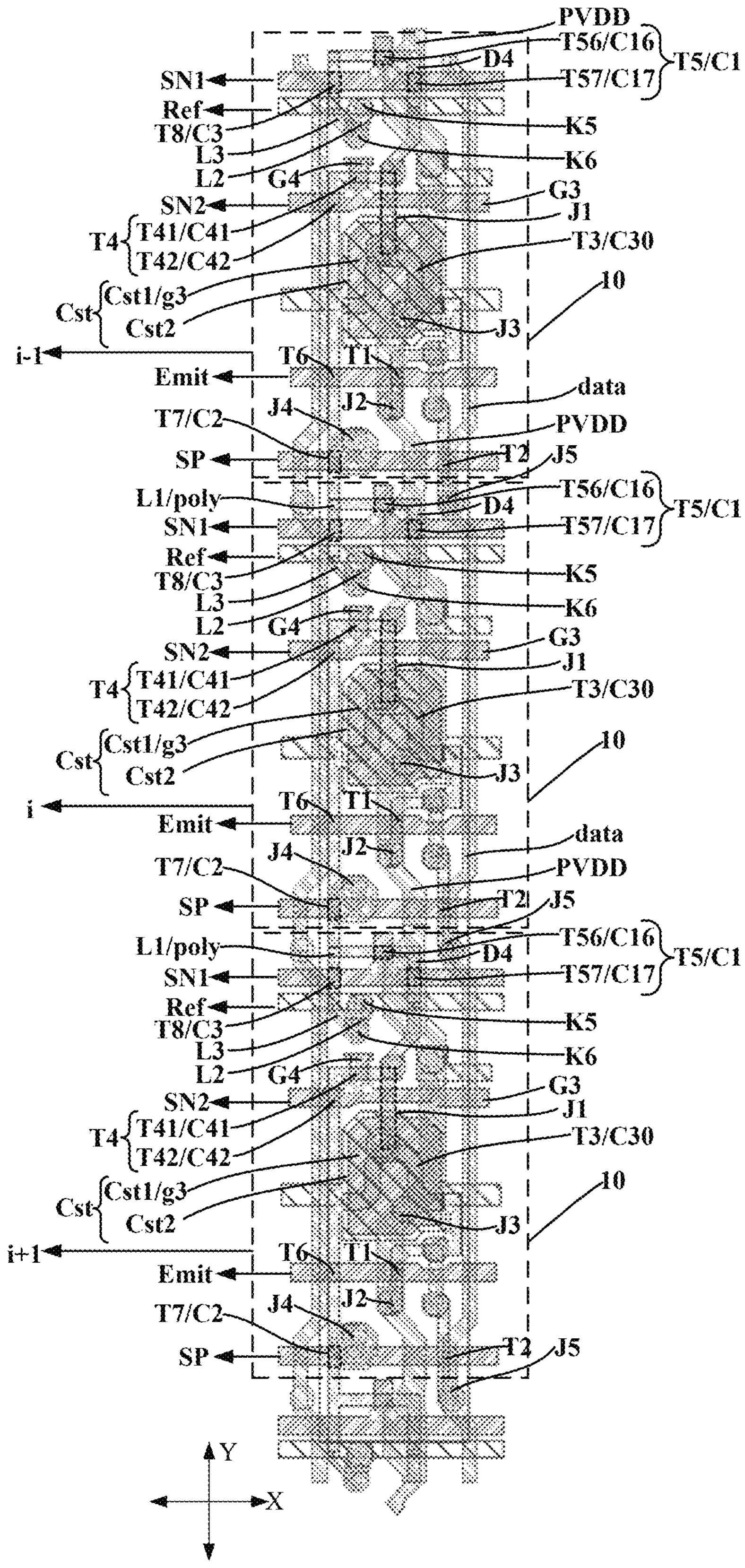
FIG. 12 illustrates a layout diagram of three adjacent rows of pixel circuits within a column of pixel circuits in another display panel consistent with various embodiments of the present disclosure.

FIG. 12 illustrates a layout diagram of three adjacent rows of pixel circuits 10 within a column of pixel circuits in another display panel consistent with various embodiments of the present disclosure. As shown in FIGS. 1, 3 and 12, the pixel circuit 10 includes a gate reset transistor (T5) and an anode reset transistor (T7). The gate reset transistor (T5) includes a first channel region (C1) in the active layer poly. In the direction perpendicular to the plane of the base substrate (sub), the first channel region (C1) overlaps the first scan line (SN1), and the overlapping portion forms the gate of the gate reset transistor (T5). The anode reset transistor (T7) includes a second channel region (C2) in the active layer (poly). In the direction perpendicular to the plane of the base substrate (sub), the second channel region (C2) overlaps the second scan line (SP), and the overlapping portion forms the anode of the anode reset transistor (T7).

Figure 13:
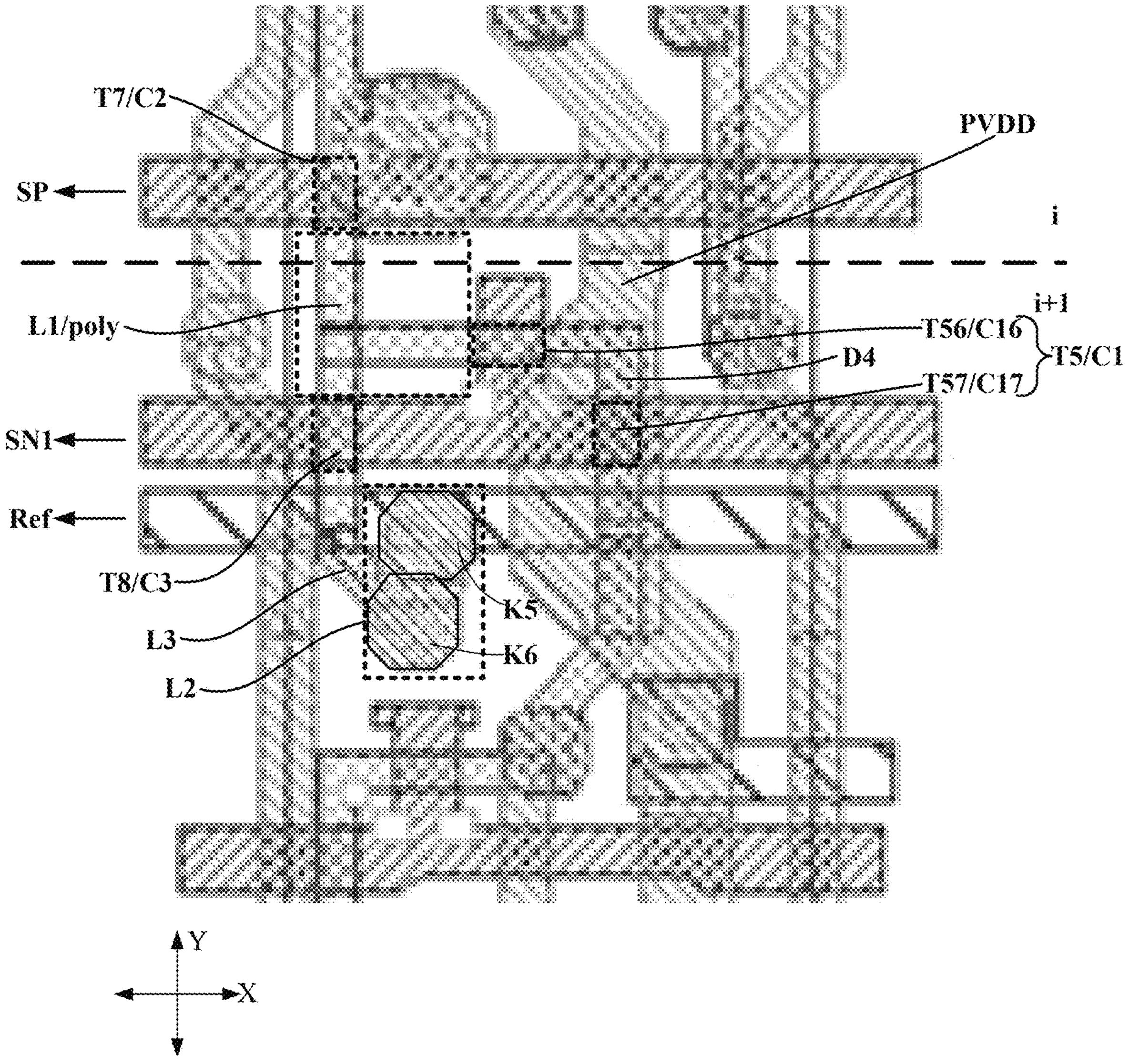
FIG. 13 illustrates an enlarged schematic diagram of a specific area shown in FIG. 12.

For better understanding the present disclosure, FIG. 13 illustrates an enlarged schematic diagram of a specific area shown in FIG. 12. As shown in FIGS. 12 and 13, in a same column of pixel circuits, the second channel region (C2) of the anode reset transistor (T7) in the i-th row of pixel circuits 10 is directly connected to the first channel region (C1) of the gate reset transistor (T5) in the (i+1)-th row of pixel circuits through the first connection portion (L1) in the active layer (poly). That is, in a same column of pixel circuits 10, the second channel region (C2) of the anode reset transistor (T7) of the i-th row of pixel circuits 10, located in the active layer (poly), is directly connected to the first connection portion (L1). In a same column of pixel circuits 10, the first channel region (C1) of the gate reset transistor (T5) of the (i+1)-th row of pixel circuits 10, located in the active layer (poly), is directly connected to the first connection portion (L1), so that the second channel region (C2) of the anode reset transistor (T7) in the i-th row of pixel circuits 10 is directly connected to the first channel region (C1) of the gate reset transistor (T5) in the (i+1)-th row of pixel circuits in a same column of pixel circuits 10 through the first connection portion (L1) of a same layer. In other words, in a same column of pixel circuits, the second channel region (C2) of the anode reset transistor (T7) in the i-th row of pixel circuits 10 is directly connected to the first channel region (C1) of the gate reset transistor (T5) in the (i+1)-th row of pixel circuits 10 through the first connection portion (L1) in the active layer (poly), where i is a positive integer.

As shown in FIGS. 12 and 13, the first connection portion (L1) is electrically connected to the reference voltage line (Ref). Therefore, the reference voltage line (Ref) may be electrically connected to the anode reset transistor (T7) of the i-th row of pixel circuits 10 and to the gate reset transistor (T5) of the (i+1)-th row of pixel circuits 10 in the same column of pixel circuits through the first connection portion (L1).

Therefore, by reducing number of holes through which the reference voltage line (Ref) is electrically connected to the anode reset transistor (T7) of the i-th row of pixel circuits 10 and the gate reset transistor (T5) of the (i+1)-th row of pixel circuits in a same column of pixel circuits, space occupied by the pixel circuits 10 can be saved. If the pixel circuits 10 operate in a low-frequency driving mode, the space occupied by the low-frequency pixel circuits can be further reduced, which is conducive to developing display panels with high pixel density and resolution.

As shown in FIGS. 1, 12 and 13, the first scan line (SN1) may be located on the metal layer (M1), and the second scan line (SP) may also be located on the metal layer (M1). As shown in FIGS. 1, 12 and 13, the reference voltage line (Ref) can be located on the first metal layer on a side of the active layer (poly) facing away from the base substrate (sub). The first metal layer may be the metal layer (MC), while the first connection portion (L2) is in the active layer (poly). Therefore, the reference voltage line (Ref) and the first connection portion (L1) are arranged in different layers.

As shown in FIGS. 12 and 13, the pixel circuit 10 further includes a connection transistor (T8) with a third channel region (C3) in the active layer (poly). In a same column of pixel circuits, in the direction perpendicular to the plane of the base substrate, the third channel region (C3) of the connection transistor (T8) in the i-th row of pixel circuits 10 and the first channel region (C1) of the gate reset transistor (T5) in the (i+1)-th row of pixel circuits 10 overlap a same first scan line (SN1). In the direction perpendicular to the plane of the base substrate, a portion where the first scan line (SN1) overlaps the third channel region C3 forms the gate of the connection transistor (T8). When the first scan signal (VSN1) on the first scan line (SN1) is at an active level and the gate reset transistor (T5) in the (i+1)-th row of pixel circuits 10 is turned on, the connection transistor (T8) in the i-th row of pixel circuits 10 will be turned on at a same time.

As shown in FIGS. 1, 12 and 13, the reference voltage line (Ref) is electrically connected to the first connection portion (L1) sequentially through the second connection portion (L2), the third connection portion (L3) and the third channel region (C3). The second connection portion (L2) is located on the second metal layer, the second metal layer is located on the side of the first metal layer facing away from the base substrate (sub), and the third connection portion (L3) is in the active layer (poly). Optionally, the first metal layer is metal layer (MC), the second metal layer is metal layer (M2), and metal layer (M2) is on a side of metal layer (MC) facing away from the base substrate (sub). The reference voltage line (Ref) in the metal layer (MC) is electrically connected to the third connection portion (L3) located in the active layer poly through the second connection portion (L2) in the metal layer (M2). The third connection portion (L3) is electrically connected to the third channel region (C3) in the active layer (poly), and the third channel region (C3) is electrically connected to the first connection part (L1) in the active layer (poly).

It can be understood that the reference voltage line (Ref) is electrically connected to the second connection portion (L2) through a via hole between the first metal layer (i.e., metal layer (MC)) and the second metal layer (i.e., metal layer (M2)). The second connection portion (L2) is electrically connected to the third connection portion (L3) through a via hole between the second metal layer (i.e., the metal layer (M2)) and the active layer (poly). The third connection portion (L3) is electrically connected to the first connection portion (L1) in the active layer (poly) through the third channel region (C3). The first connection portion (L1), located in the active layer (poly), is electrically connected to the second channel region (C2) of the anode reset transistor (T7) of the i-th row of pixel circuits 10 and the first channel region (C1) of the gate reset transistor (T5) of the (i+1)-th row of pixel circuits in the same column of pixel circuits. Therefore, the reference voltage line (Ref) only needs to pass through two vias to transmit the reference voltage signal (VRef) to the second channel region (C2) of the anode reset transistor (T7) of the i-th row of pixel circuits 10 and to the first channel region (C1) of the gate reset transistor (T5) of the (i+1)-th row of pixel circuits in a same column of pixel circuits.

The third connection portion (L3) and the third channel region (C3) are both in the active layer (poly), and both serve to electrically connect the reference voltage line (Ref) and the first connection portion (L1). If only a part of the active layer (poly) is used for electrical connection, a resistance of the part of the active layer (poly) is relatively large. However, if the part of the active layer (poly) used for electrical connection forms a channel, the resistance can be reduced. Therefore, overlapping the third channel region (C3) in the active layer (poly) and the first scan line (SN1) in the direction perpendicular to the plane of the base substrate, can reduce a connection resistance of third channel region (C3) in the active layer (poly) and shorten a length between the first connection portion (L1) and the third connection in the active layer (poly) is shortened, which facilitates more efficient transmission of the reference voltage signal (VRef) on the reference voltage line (Ref) to the second channel region (C2) of the anode reset transistor (T7) in the i-th row of pixel circuits 10 and to the first channel region (C1) of the gate reset transistor (T5) in the (i+1)-th row of pixel circuits 10.

As shown in FIG. 12 and FIG. 13, the gate reset transistor (T5) in the i-th row of pixel circuits 10 is electrically connected to a first scan line (SN1), the connection transistor T8 in the i-th row of pixel circuits 10 and the gate reset transistor (T5) in the (i+1)-th row of pixel circuits 10 are electrically connected to another first scan line (SN1), and the anode reset transistor (T7) in the i-th row of pixel circuits is electrically connected to a second scan line (SP). Therefore, the gate reset transistor (T5) and the connection transistor (T8) in the i-th row of pixel circuits 10 are each electrically connected to one first scan line (SN1), that is, the i-th row of pixel circuits 10 is electrically connected to two first scan lines (SN1). The connection transistor (T8) in the i-th row of pixel circuits 10 and the gate reset transistor (T5) in the (i+1)-th row of pixel circuits 10 are electrically connected to the same first scan line (SN1), so that connection transistor (T8) in the i-th row of pixel circuits 10 and the gate reset transistor (T5) in the (i+1)-th row of pixel circuits 10 are turned on simultaneously.

As shown in FIGS. 12 and 13, the reference voltage line (Ref) is located on a side of the first scan line (SN1), which is electrically connected to both the common transistor (T8) in the i-th row of pixel circuits 10 and the gate reset transistor (T5) in the (i+1)-th row of pixel circuits 10, away from the second scan line (SN2), which is electrically connected to the anode reset transistor (T7) in the i-th row of pixel circuits 10. Therefore, along the second direction (Y), the first scan lines (SN1), the reference voltage lines (Ref), and the second scan lines (SN2) are arranged in sequence.

As shown in FIG. 12 and FIG. 13, in a same column of pixel circuits, the second channel region (C2) of the anode reset transistor (T7) in the i-th row of pixel circuits 10, the third channel region (C3) of the connection transistor (T8) in the i-th row of pixel circuits 10, and the first channel region (C1) of the gate reset transistor (T5) in the (i+1)-th row of pixel circuits 10 are located on a same side of the reference voltage line (Ref) along the second direction (Y). The above arrangement not only facilitates a direct connection between the second channel region (C2) of the anode reset transistor (T5) in the i-th row of pixel circuits 10 and the first channel region (C1) of the gate reset transistor (T5) in the (i+1)-th row of pixel circuits 10 in a same column of pixel circuits through the first connection portion (L1) in the active layer (poly), but also facilitates an electrical connection of the reference voltage line (Ref) to the first connection portion (L1) through the third channel region (C3), thereby further saving space occupied by the pixel circuits 10.

As shown in FIG. 12 and FIG. 13, one end of the second connection portion (L2) is electrically connected to the reference voltage line (Ref) through a fifth via hole (K5), while the other end of the second connection portion (L2) is electrically connected to the third connection portion (L3) through a sixth via hole (K6). Along the second direction (Y), the fifth via hole (K5) and the sixth via hole (K6) are on a same side of the first scan line SN1 where the connection transistor (T8) in the i-th row of pixel circuits 10 is electrically connected to the gate reset transistor (T5) in the (i+1)-th row of pixel circuits 10.

It can be understood that, in the direction perpendicular to the plane of the base substrate, the second connection portion (L2) at least partially overlaps the reference voltage line (Ref). Therefore, the second connection portion (L2) is electrically connected to the reference voltage line (Ref) through the fifth via hole (K5) between the first metal layer (i.e., the metal layer (MC)) and the second metal layer (i.e., the metal layer (M2)).

Similarly, in the direction perpendicular to the plane of the base substrate, the second connection portion (L2) also at least partially overlaps the third connection portion (L3), so that the second connection portion (L2) and the third connection portion (L3) are electrically connected through the sixth via hole (K6) between the second metal layer (i.e., the metal layer (M2)) and the active layer (poly).

As shown in FIGS. 12 and 13, the fifth via hole (K5) can overlap the sixth via hole (K6). Therefore, a length of the second connection portion (L2) can be shorten, which can further save space occupied by the pixel circuits. As shown in FIGS. 12 and 13, the first scan line (SN1) includes a main body part (G1) extending along the first direction (X) and a second protruding part (G5) extending from the main body part G1 along the second direction (Y).

As shown in FIG. 12 and FIG. 13, the gate reset transistor (T5) includes a sixth sub-transistor (T56) and a seventh sub-transistor (T57). The first channel region (C1) of the gate reset transistor (T5) includes a sixth sub-channel region (C16) of the sixth sub-transistor (T56) and a seventh sub-channel region (C17) of the seventh sub-transistor (T57). In the direction perpendicular to the plane of the base substrate, the sixth sub-channel region (C16) overlaps the second protruding portion (G5) of the first scan line (SN1), while the seventh sub-channel region (C17) overlaps the main body portion (G1) of the first scan line (SN1). A portion where the second protruding portion (G5) of the first scan line (SN1) overlaps the sixth sub-channel region (C16) forms the gate of the sixth sub-transistor (T56). A portion where the main body portion (G1) of the first scan line (SN1) overlaps the seventh sub-channel region (C17) forms the gate of the seventh sub-transistor (T57).

As shown in FIG. 12 and FIG. 13, one end of the sixth sub-channel region (C16) is directly connected to the first connection portion (L1), while the other end of the sixth sub-channel region (C16) is directly connected to one end of the seventh sub-channel region (C17) through the fourth sub-connection portion (D4) in the active layer (poly). As shown in FIGS. 1, 12 and 13, the driving transistor (T3) includes a channel region (C30) in the active layer (poly) and a gate (g3) in the metal layer (M1). In the direction perpendicular to the plane of the base substrate, the gate (g3) of the driving transistor (T3) overlaps the channel region (C30). As shown in FIG. 12, one end of the seventh sub-channel region (C17) in the gate reset transistor (T5), which is away from the fourth sub-connection portion (D4), is electrically connected to the gate (g3) of the driving transistor (T3) through the connection portion (J1).

As seen from the above, the gate reset transistor (T5) includes a sixth sub-transistor (T56) and a seventh sub-transistor (T57). That is, the gate reset transistor (T5) is a transistor with a double-gate structure, which is conducive to reducing current leakage from the gate reset transistor (T5) to the gate (g3) of the driving transistor (T3), thereby maintaining the stability of the gate potential of the driving transistor (T3), and reducing screen shaking in the display panel under low-frequency driving.

As shown in FIG. 12 and FIG. 13, the display panel includes a plurality of first power supply voltage lines (PVDD). Referring to FIG. 3, the display panel also includes a plurality of light-emitting elements 30, and the first power supply voltage lines (PVDD) are electrically connected to the light-emitting elements 30 through the pixel circuits 10.

As shown in FIG. 12, the first power supply voltage lines (PVDD) extend along the second direction (Y). As shown in FIG. 1 and FIG. 12, the first power supply voltage lines (PVDD) may be in the metal layer (M2). As shown in FIG. 3 and FIG. 11, the first power supply voltage line (PVDD) is electrically connected to the first electrode of the first light-emitting control transistor (T1) through the connection portion (J2) and to one plate (Cst2) of the storage capacitor (Cst) through the connection portion (J3). The other plate of the storage capacitor (Cst) is the gate (g3) of the driving transistor (T3). The second electrode of the first light-emitting control transistor (T1) is electrically connected to the first electrode of the driving transistor (T3) in the active layer (poly). The second electrode of the driving transistor (T3) is electrically connected to the first electrode of the second light-emitting control transistor (T6) in the active layer (poly). The second electrode of the second light-emitting control transistor (T6) is electrically connected to the first electrode of the anode reset transistor (T7) in the active layer (poly). The second electrode of the second light emission control transistor (T6) and the second electrode of the anode reset transistor (T7) are electrically connected to the light-emitting element 30 through the connection portion (J4).

As shown in FIGS. 12 and 13, in the direction perpendicular to the plane of the base substrate, the fourth sub-connection portion (D4) at least partially overlaps the first power supply voltage line (PVDD), and the first power supply voltage line (PVDD) may be in the metal layer (M2). Therefore, the first power supply voltage line (PVDD)

covers at least part of the fourth sub-connection portion (D4), and the first power supply voltage signal (VPVDD) on the first power supply voltage line (PVDD) is a constant voltage signal. The third sub-connection portion (D2) and the first power supply voltage line (PVDD) can form a shielding capacitor, which can reduce an impact on the gate potential of the driving transistor (T3), maintain the stability of the gate potential of the driving transistor (T3), and reduce screen shaking in the display panel under low-frequency driving. In addition, since the first power supply voltage line (PVDD) can be in the metal layer (M2), the first power supply voltage line (PVDD) can also shield the third sub-connection portion (D3), which is also conducive to maintaining the stability of the gate potential of the driving transistor (T3) and reducing screen shake in the display panel under low-frequency driving.

As shown in FIG. 1, FIG. 3 and FIG. 12, in the pixel circuit 10, the compensation transistor (T4) may include a sub-transistor (T41) and a sub-transistor (T42). The sub-transistor (T41) includes a channel region (C41) in the active layer (poly), and the sub-transistor (T42) includes a channel region (C42) in the active layer (poly). As shown in FIG. 12, the third scan line (SN2) includes a main body part (G3) extending in the first direction (X) and a protruding part (G4) extending from the main body part (G3) in the second direction (Y).

As shown in FIG. 12, in the direction perpendicular to the plane of the base substrate, the channel region (C41) overlaps the protruding portion (G4) of the third scan line (SN2), and the overlapping portion forms the gate of the sub-transistor (T41). In the direction perpendicular to the plane of the base substrate, the channel region (C42) overlaps the main body portion (G3) of the third scan line (SN2), and the overlapping portion forms the gate of the sub-transistor (T42).

As shown in FIG. 12, one end of the channel region (C41) of the sub-transistor (T41) is electrically connected to the gate (g3) of the driving transistor (T3) through the connection portion (J1). The other end of the channel region (C41) of the sub-transistor (T41) is electrically connected to one end of the channel region (C42) of the sub-transistor (T42) in the active layer (poly). The other end of the channel region (C42) of the sub-transistor (T42) is electrically connected to the second electrode of the driving transistor (T3) in the active layer (poly).

Since the compensation transistor (T4) includes a sub-transistor (T41) and a sub-transistor (T42), the compensation transistor (T4) is a transistor with a double-gate structure, which is conducive to reducing current leakage from the compensation transistor (T4) to the gate of the driving transistor (T3), thereby maintaining the stability of the gate potential of the driving transistor (T3), and reducing screen shaking in the display panel under low-frequency driving.

As shown in FIG. 3 and FIG. 12, the display panel includes a plurality of data lines (data) extending along the second direction (Y). The first electrode of the data writing transistor (T2) in the pixel circuit 10 is electrically connected to the data line (data) through the connection portion (J5). The second electrode of the data writing transistor (T2) is electrically connected to the first electrode of the driving transistor (T3) in the active layer (poly). As shown in FIG. 1 and FIG. 9, the data lines (data) may be in the metal layer (M2).

Figure 14:
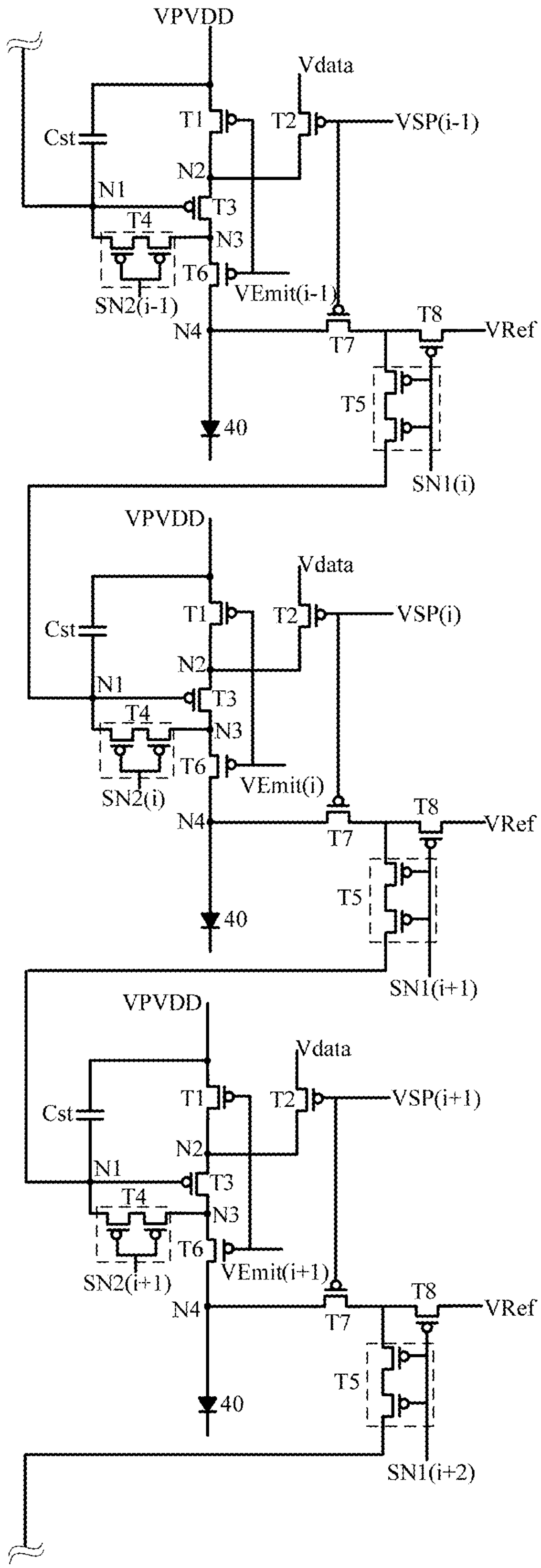
FIG. 14 illustrates a circuit diagram of three adjacent rows of pixel circuits in a same column of pixel circuits shown in FIG. 12.

FIG. 14 illustrates a circuit diagram of three adjacent rows of pixel circuits 10 in a same column of pixel circuits shown in FIG. 12. As shown in FIG. 12 and FIG. 14, a reference voltage line (Ref) is electrically connected to the anode reset transistor (T7) in the i-th row of pixel circuits 10 through the connecting transistor (T8) in the i-th row of pixel circuits 10 in a same column of pixel circuits, and is electrically connected to the gate reset transistor (T5) in the (i+1)-th row of pixel circuits 10 in a same column of pixel circuits. Furthermore, the connection transistor (T8) in the i-th row of pixel circuits 10 and the gate reset transistor (T5) in the (i+1)-th row of pixel circuits 10 in a same column of pixel circuits are electrically connected to a same first scan line (SN1) and are activated by a same first scan signal (VSN1). Therefore, in a same column of pixel circuits, when a scan signal transmitted by the second scan line (SP) (i.e., the second scan signal (VSP)) received by the gate of the anode reset transistor (T7) in the i-th row of pixel circuits 10 is at an active level, a scan signal transmitted by the first scan line (SN1) (i.e., the first scan signal (VSN1)) and received by the gate of the gate reset transistor (T5) in the (i+1)-th row pixel circuit is also at an active level. When the anode reset transistor (T7) in the i-th row of pixel circuits 10 is turned on by the second scan signal (VSP) at the active level, which is transmitted through the electrically connected second scan line (SP), the connection transistor (T8) in the i-th row of pixel circuit 10 is also turned on by the first scan signal (VSN1) at an active level, which is transmitted through the electrically connected first scan line (SN1), so that the reference voltage signal (VRef) on the reference voltage line (Ref) resets the fourth node (N4) in the i-th row of pixel circuits 10 through the turned-on connection transistor (T8) and anode reset transistor (T7). The gate reset transistor (T5) in the (i+1)-th row of pixel circuits 10 is also activated by the transmitted first scan signal (VSN1) at an active level, so that the reference voltage signal (VRef) on the reference voltage line (Ref) also resets the first node (N1) of the (i+1)-th row of pixel circuits 10 through the turned-on connection transistor (T8) and gate reset transistor (T5).

Figure 15:
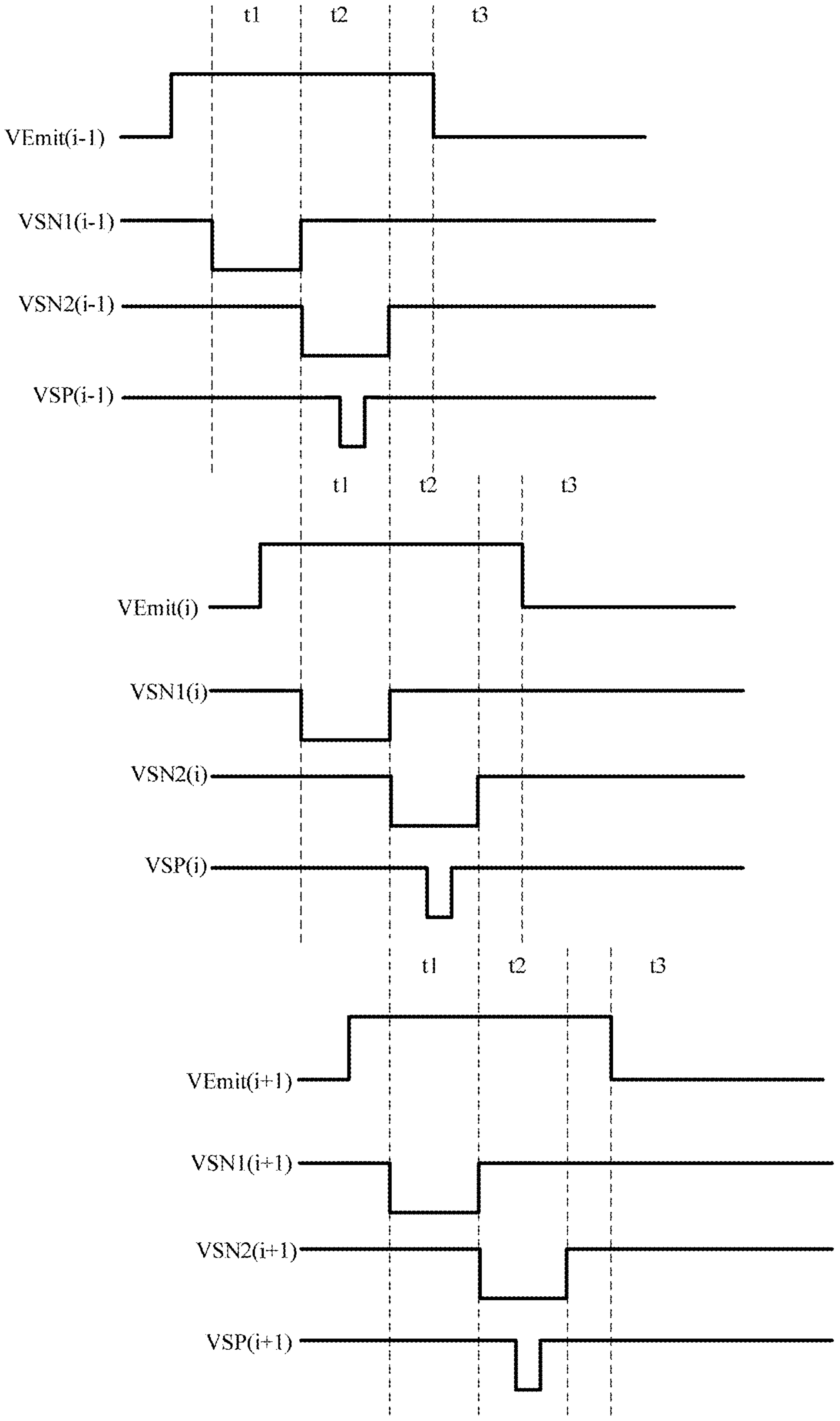
FIG. 15 illustrates a timing diagram of signals provided to three adjacent rows of pixel circuits in a same column of pixel circuits shown in FIG. 14.

FIG. 15 illustrates a timing diagram of signals provided to three adjacent rows of pixel circuits 10 in a same column of pixel circuits shown in FIG. 14. As shown in FIGS. 12, 14 and 15, in a same column of pixel circuits, when the first scan signal (VSN1(*i*)) that drives the gate reset transistor (T5) in the i-th row of pixel circuits 10 is at an active level, the i-th row of pixel circuits 10 enters the (t1) period, the gate reset transistor (T5) in the i-th row of pixel circuits 10 is turned on, and the connection transistor (T8) in the (i−1)-th row pixel circuit 10 is also turned on, so that the reference voltage signal (VRef(i)), provided by the reference voltage line (Ref) and electrically connected to the gate reset transistor (T5) in the i-th row of pixel circuits 10, resets the first node (N1) in the i-th row of pixel circuits 10 through the connection transistor (T8) in the (i−1)-th row pixel circuit 10 and the gate reset transistor (T5) in the i-th row of pixel circuits 10. The second scan signal (VSP(i−1)) that drives the anode reset transistor (T7) in the (i−1)-th row pixel circuit 10 is also at an active level during at least part of the active level period of the first scan signal (VSN1(*i*)), so that the anode reset transistor (T7) in the (i−1)-th row pixel circuit 10 is turned on. Therefore, the reference voltage signal (VRef(i)), provided by the reference voltage line (Ref) and electrically connected to the anode reset transistor (T7) in the (i−1)-th row pixel circuit 10, resets the fourth node (N4) in the i−1th row pixel circuit 10 through the connection transistor (T8) in the (i−1)-th row pixel circuit 10 and the anode reset transistor (T7) in the (i−1)-th row pixel circuit 10.

The third scan signal (VSN2(*i*)) driving the i-th row of pixel circuits 10 is at an active level, the i-th row of pixel circuits 10 enters the (t2) period, and the compensation transistor (T4) in the i-th row of pixel circuits 10 is turned on. Furthermore, the second scan signal (VSP(i)) that drives the i-th row of pixel circuits 10 is at an active level, so that the data writing transistor (T2) of the i-th row of pixel circuits 10 is turned on, and a data signal is written to the gate of the driving transistor (T3) of the i-th row of pixel circuits 10.

The second scan signal (VSP(i)) that drives the i-th row of pixel circuits 10 is at an active level, so that the anode reset transistor (T7) of the i-th row of pixel circuits 10 is turned on. Furthermore, the first scan signal (VSN1(*i*+1)) that drives the gate reset transistor (T5) in the (i+1)-th row of pixel circuits 10 is also at an active level, so that the connection transistor (T8) in the i-th row of pixel circuits 10, and the gate reset transistor (T5) in the (i+1)-th row of pixel circuits 10 are turned on. Therefore, not only does the reference voltage signal (VRef(i)), provided by the reference voltage line (Ref) and electrically connected to the anode reset transistor (T7) in the i-th row of pixel circuits 10, reset the fourth node (N4) in the i-th row of pixel circuits 10 through the connection transistor (T8) in the i-th row of pixel circuits 10 and the anode reset transistor (T7) in the i-th row of pixel circuits 10, but also the reference voltage signal (VRef(i)), provided by the reference voltage line (Ref) and electrically connected to the gate reset transistor (T5) in the (i+1)-th row of pixel circuits 10, resets the first node (N1) in the (i+1)-th row of pixel circuits 10 through the connection transistor (T8) in the i-th row of pixel circuits 10 and the gate reset transistor (T5) in the (i+1)-th row of pixel circuits 10.

The light-emitting control signal (VEmit) that drives the i-th row of pixel circuits 10 is at an active level, so that the i-th row of pixel circuits 10 enters the (t3) period and drives the light-emitting element 40 to emit light. Moreover, the (i+1)-th row of pixel circuits also enters the (t2) period and the t3 period in sequence.

Therefore, in a same column of pixel circuits, if a scan signal transmitted by the second scan line (SP) (i.e., the second scan signal (VSP)) and received by the gate of the anode reset transistor (T7) in the i-th row of pixel circuits 10 is at an active level, a scan signal transmitted by the first scan line (SN1) (i.e., the first scan signal (VSN1)) and received by the gate of the gate reset transistor (T5) in the (i+1)-th row of pixel circuits is also at an active level. An active level period of a scan signal (i.e., the second scan signal (VSP)) transmitted by the second scan line (SP) and received by the gate of the anode reset transistor (T7) in the i-th row of pixel circuits 10 may be shorter than an active level period of a scan signal transmitted by the first scan line (SN1) (i.e., the first scan signal (VSN1)) and received by the gate of the gate reset transistor (T5) in the (i+1)-th row of pixel circuits.

Figure 16:
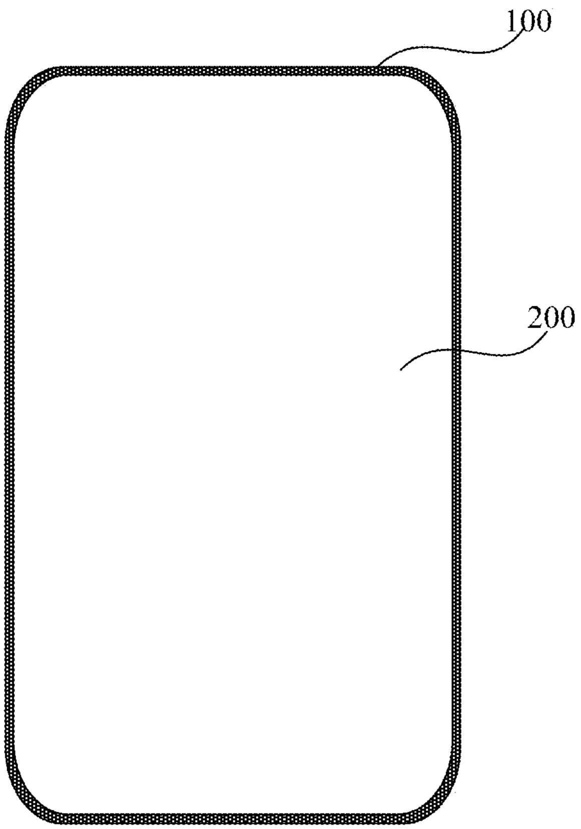
FIG. 16 illustrates a top view of a display device consistent with various embodiments of the present disclosure.

Based on a same inventive concept, a display device is provided in one embodiment of the present disclosure. As shown in FIG. 16, the display device 100 includes a display panel 200 provided in any of the above embodiments. The display panel 200 has been described in detail in previous embodiments, which will not be repeated herein. The display device 100 may be any electronic device with a display function, such as a touch screen, a mobile phone, a tablet computer, a notebook computer, an electronic paper book, or a television.

As disclosed, the display panel and the display device provided by the present disclosure at least realize the following beneficial effects.

In the display panel, the second channel region of the anode reset transistor of an i-th row of pixel circuits is directly connected to the first channel region of the gate reset transistor of the (i+1)-th row of pixel circuits through the first connection portion in the active layer directly connected in a same column of pixel circuits. If the first connection portion is electrically connected to the reference voltage line, the reference voltage line may be electrically connected to the anode reset transistor in the i-th row pixel circuit and the gate reset transistor in the (i+1)-th row pixel circuit in a same column of pixel circuits through the first connection portion. Number of holes that are electrically connected between the reference voltage line and the anode reset transistor of the i-th row pixel circuit and the gate reset transistor of the (i+1)-th row pixel circuit in a same column of pixel circuits can be reduced, thereby saving space occupied by the pixel circuits. If the pixel circuits operate in a low-frequency driving mode, space occupied by low-frequency pixel circuits can be reduced, which is conducive to developing display panels with high pixel density and resolution.

Each part in the present specification is described in a parallel and progressive manner, focusing on differences from other parts. Similar or identical elements across various parts may reference one another.

Regarding the above description of the disclosed embodiments, features described in each embodiment of the present specification can be substituted or combined with one another, allowing a person skilled in the art to implement or utilize the present disclosure. Various modifications to the embodiments will be apparent to a person skilled in the art. General principles defined herein may be applied to other embodiments without departing from the spirit or scope of the present disclosure. Therefore, the present disclosure is not to be limited to the embodiments shown herein but is to be accorded the broadest scope consistent with principles and novel features disclosed herein.

What is claimed is:

1. A display panel, comprising:

a base substrate;

an active layer on a side of the base substrate;

a plurality of pixel circuits arranged in an array along a first direction and a second direction, the first direction intersecting the second direction;

a plurality of first scan lines, a plurality of second scan lines and a plurality of reference voltage lines, all of which extend along the first direction;

a pixel circuit of the plurality of pixel circuits including a gate reset transistor and an anode reset transistor, the gate reset transistor including a first channel region in the active layer, the first channel region overlapping a first scan line of the plurality of first scan lines in a direction perpendicular to a plane of the base substrate, the anode reset transistor including a second channel region in the active layer, and the second channel region overlapping a second scan line of the plurality of second scan lines in the direction perpendicular to the plane of the base substrate; and in a same column of pixel circuits, the second channel region of the anode reset transistor in an i-th row of pixel circuits being directly connected to the first channel region of the gate reset transistor in an (i+1)-th row of pixel circuits through a first connection portion in the active layer, a reference voltage line of the plurality of reference voltage lines being electrically connected to the first connection portion and i being a positive integer.

2. The display panel according to claim 1, wherein:

the plurality of reference voltage lines is located on a first metal layer on a side of the active layer facing away from the base substrate; and the plurality of reference voltage lines is electrically connected to the first connection portion through a second connection portion on a second metal layer, and the second metal layer is located on a side of the first metal layer facing away from the base substrate.

3. The display panel according to claim 2, wherein:

one row of pixel circuits is electrically connected to one first scan line of the plurality of first scan lines and one second scan line of the plurality of second scan lines;

a reference voltage line of the plurality of reference voltage lines is between a second scan line electrically connected to an i-th row of pixel circuits and a first scan line electrically connected to an (i+1)-th row of pixel circuits; and in a same column of pixel circuits, the second channel region of the anode reset transistor in the i-th row of pixel circuits, and the first channel region of the gate reset transistor in the (i+1)-th row of pixel circuits are located on opposite sides of the reference voltage line of the plurality of reference voltage lines along the second direction.

4. The display panel according to claim 3, wherein:

one end of the second connection portion is electrically connected to the reference voltage line through a first via hole;

the other end of the second connecting part is electrically connected to the first connection portion through a second via hole; and the first via hole and the second via holes are located between the second scan line, which is electrically connected to the i-th row of pixel circuits, and the first scan line, which is electrically connected to the (i+1)-th row of pixel circuits.

5. The display panel according to claim 4, wherein:

the gate reset transistor includes a first sub-transistor, a second sub-transistor and a third sub-transistor;

the first channel region of the gate reset transistor includes a first sub-channel region of the first sub-transistor, a second sub-channel region of the second sub-transistor, and a third sub-channel region of the third sub-transistor, all the first sub-channel region, the second sub-channel region and the third sub-channel region overlap the first scan line in the direction perpendicular to the plane of the base substrate; and one end of the first sub-channel region is directly connected to the first connection portion, while the other end of the first sub-channel region is directly connected to one end of the second sub-channel region through a first sub-connection portion in the active layer, and the other end of the second sub-channel region is directly connected to one end of the third sub-channel region through a second sub-connection portion in the active layer.

6. The display panel according to claim 5, wherein the second sub-connection portion at least partially overlaps the reference voltage line in the direction perpendicular to the plane of the base substrate.

7. The display panel according to claim 5, further comprising a plurality of first power supply voltage lines and a plurality of light-emitting elements, wherein:

the plurality of first power supply voltage lines is electrically connected to the plurality light-emitting elements through the pixel circuits; and the plurality of first power supply voltage lines extends along the second direction, and the second sub-connection portion at least partially overlaps the plurality of first power voltage lines in the direction perpendicular to the plane of the base substrate.

8. The display panel according to claim 6, further comprising a plurality of first power supply voltage lines and a plurality of light-emitting elements, wherein:

the plurality of first power supply voltage lines is electrically connected to the plurality light-emitting elements through the pixel circuits; and the plurality of first power supply voltage lines extends along the second direction, and the second sub-connection portion at least partially overlaps the plurality of first power voltage lines in the direction perpendicular to the plane of the base substrate.

9. The display panel according to claim 2, wherein:

one row of pixel circuits is electrically connected to one first scan line and one second scan line;

along the second direction, the reference voltage line is positioned on a side of the first scan line, which is electrically connected to the (i+1)-th row of pixel circuits, and is located away from the second scan line, which is electrically connected to the i-th row of pixel circuits; and in a same column of pixel circuits, the second channel region of the anode reset transistor in the i-th row of pixel circuits and the first channel region of the gate reset transistor in the (i+1)-th row of pixel circuits are on a same side of the reference voltage line along the second direction.

10. The display panel according to claim 9, wherein:

one end of the second connection portion is electrically connected to the reference voltage line through a third via hole;

the other end of the second connection portion is electrically connected to the first connection portion through a fourth via hole; and along the second direction, the third via hole and the fourth via hole are located on opposite sides of the first scan line electrically connected to the (i+1)-th row of pixel circuits.

11. The display panel according to claim 10, wherein:

the first scan line includes a main body portion extending along the first direction and a first protruding portion extending from the main body portion along the second direction;

the gate reset transistor includes a fourth sub-transistor and a fifth sub-transistor, the first channel region of the gate reset transistor includes a fourth sub-channel region of the fourth sub-transistor and a fifth sub-channel region of the fifth sub-transistor, in the direction perpendicular to the plane of the base substrate, the fourth sub-channel region overlaps the first protruding portion, while the fifth sub-channel region overlaps the main body portion; and one end of the fourth sub-channel region is directly connected to the first connection portion, while the other end of the fourth sub-channel region is directly connected to one end of the fifth sub-channel region through a third sub-connection portion in the active layer.

12. The display panel according to claim 11, wherein:

the pixel circuit also includes a first shielding portion on a side of the active layer facing away from the base substrate; and the third sub-connection portion at least partially overlaps the first shielding portion in the direction perpendicular to the plane of the base substrate.

13. The display panel according to claim 11, further comprising a plurality of first power supply voltage lines and a plurality of light-emitting elements, wherein:

the plurality of first power supply voltage lines is electrically connected to the plurality of light-emitting elements through the pixel circuits; and the plurality of first power supply voltage lines extends along the second direction, and the third sub-connection portion at least partially overlaps the plurality of first power supply voltage lines in the direction perpendicular to the plane of the base substrate.

14. The display panel according to claim 1, wherein:

the plurality of reference voltage lines is located on a first metal layer on a side of the active layer facing away from the base substrate;

the pixel circuit also includes a connection transistor, which includes a third channel region in the active layer;

in a same column of pixel circuits, in the direction perpendicular to the plane of the base substrate, the third channel region of the connection transistor in the i-th row of pixel circuits and the first channel region of the gate reset transistor in the (i+1)-th row of the pixel circuits overlap a same first scan line; and the plurality of reference voltage lines is electrically connected to the first connection portion through the second connection portion, the third connection portion, and the third channel region in sequence, the second connection portion is located on the second metal layer, which is on a side of the first metal layer facing away from the base substrate, and the third connection portion is located in the active layer.

15. The display panel according to claim 14, wherein:

the gate reset transistor in the i-th row of pixel circuits is electrically connected to a first scan line, the connection transistor in the i-th row of pixel circuits and the gate reset transistor of the the (i+1)-th row of pixel circuits are electrically connected to another first scan line, and the anode reset transistor in the i-th row of pixel circuits is electrically connected to a second scan line;

the reference voltage line is located on a side of the first scan line where the connection transistor in the i-th row of pixel circuits is electrically connected to the gate reset transistor in the (i+1)-th row of pixel circuits, and is positioned away from the second scan line, which is electrically connected to the anode reset transistor in the i-th row of pixel circuits; and in a same column of pixel circuits, the second channel region of the anode reset transistor in the i-th row of pixel circuits, the third channel region of the connection transistor in the i-th row of pixel circuits, and the first channel region of the gate reset transistor in the (i+1)-th row of pixel circuits are located on a same side of the reference voltage line along the second direction.

16. The display panel according to claim 15, wherein:

one end of the second connection portion is electrically connected to the reference voltage line through a fifth via hole;

the other end of the second connection portion is electrically connected to the third connection portion through a sixth via hole; and along the second direction, the fifth via hole and the sixth via hole are on a same side of the first scan line, which is electrically connected to both the connection transistor in the i-th row of pixel circuits and the gate reset transistor in the (i+1)-th row of pixel circuits.

17. The display panel according to claim 16, wherein:

the first scan line includes a main body portion extending along the first direction and a second protruding portion extending from the main body portion along the second direction;

the gate reset transistor includes a sixth sub-transistor and a seventh sub-transistor, the first channel region of the gate reset transistor includes a sixth sub-channel region of the sixth sub-transistor and a seventh sub-channel region of the seventh sub-transistor, in the direction perpendicular to the plane of the base substrate, the sixth sub-channel region overlaps the second protruding portion, while the seventh sub-channel region overlaps the main body portion; and one end of the sixth sub-channel region is directly connected to the first connection portion, while the other end of the sixth sub-channel region is directly connected to one end of the seventh sub-channel region through a fourth sub-connection portion in the active layer.

18. The display panel according to claim 17, further comprising a plurality of first power supply voltage lines and a plurality of light-emitting elements, wherein:

the plurality of first power supply voltage lines is electrically connected to the plurality of light-emitting elements through the pixel circuits; and the plurality of first power supply voltage lines extends along the second direction, and the fourth sub-connection portion at least partially overlaps the plurality of first power supply voltage lines in the direction perpendicular to the plane of the base substrate.

19. The display panel according to claim 14, wherein:

in a same column of pixel circuits, when a scan signal transmitted by the second scan line and received by the gate of the anode reset transistor in the i-th row of pixel circuits is at an active level, a scan signal transmitted by the first scan line and received by the gate of the gate reset transistor in the (i+1)-th row of pixel circuits is also at an active level.

20. A display device comprising a display panel comprising:

a base substrate;

an active layer on a side of the base substrate;

a plurality of pixel circuits arranged in an array along a first direction and a second direction, the first direction intersecting the second direction;

a plurality of first scan lines, a plurality of second scan lines and a plurality of reference voltage lines, all of which extend along the first direction;

a pixel circuit of the plurality of pixel circuits including a gate reset transistor and an anode reset transistor, the gate reset transistor including a first channel region in the active layer, the first channel region overlapping a first scan line of the plurality of first scan lines in a direction perpendicular to a plane of the base substrate, the anode reset transistor including a second channel region in the active layer, and the second channel region overlapping a second scan line of the plurality of second scan lines in the direction perpendicular to the plane of the base substrate; and in a same column of pixel circuits, the second channel region of the anode reset transistor in an i-th row of pixel circuits being directly connected to the first channel region of the gate reset transistor in an (i+1)-th row of pixel circuits through a first connection portion in the active layer, a reference voltage line of the plurality of reference voltage lines being electrically connected to the first connection portion and i being a positive integer.

* * * * *